US00RE47686E

(19) United States
(12) Reissued Patent
Wilson, II et al.

(10) Patent Number: US RE47,686 E
(45) Date of Reissued Patent: Nov. 5, 2019

(54) MOBILE INSPECTION FACILITY

(71) Applicant: Allstate Insurance Company, Northbrook, IL (US)

(72) Inventors: Thomas Joseph Wilson, II, Chicago, IL (US); Stephen Lawrence Ihm, Kildeer, IL (US)

(73) Assignee: Allstate Insurance Company, Northbrook, IL (US)

(21) Appl. No.: 15/701,866

(22) Filed: Sep. 12, 2017

Related U.S. Patent Documents

Reissue of:
(64) Patent No.: 9,604,563
Issued: Mar. 28, 2017
Appl. No.: 14/933,228
Filed: Nov. 5, 2015

(51) Int. Cl.
*B60P 3/14* (2006.01)
*G06Q 40/08* (2012.01)
*G01M 17/00* (2006.01)

(52) U.S. Cl.
CPC ..... *B60P 3/14* (2013.01); *G01M 17/00* (2013.01); *G06Q 40/08* (2013.01)

(58) Field of Classification Search
None
See application file for complete search history.

(56) References Cited

U.S. PATENT DOCUMENTS 3,308,845 A * 3/1967 Bellas ..... B60P 3/14 137/234.6
3,675,800 A * 7/1972 Weyant ..... B60P 3/122 296/61
4,569,531 A * 2/1986 Beadle ..... B60P 3/40 280/149.2

(Continued)

FOREIGN PATENT DOCUMENTS

CA 2828017 A1 8/2012
CN 2154815 Y 2/1994

(Continued)

OTHER PUBLICATIONS

English Abstract and English Machine Translation of Description and Claims of CN204586638U.*

(Continued)

*Primary Examiner* — Glenn K Dawson
(74) *Attorney, Agent, or Firm* — Banner & Witcoff, Ltd.

(57) ABSTRACT

Aspects of the disclosure describe a wheeled vehicle having a structure attached thereto and configured to acquire within the interior of the structure a vehicle to be inspected. The structure is configured to receive the vehicle within its interior. In example implementations, the structure is located relative to the wheeled vehicle such that the vehicle to be inspected is loaded into and received within the structure during travel of the wheeled vehicle past the vehicle to be inspected. Having loaded the vehicle into the structure, the vehicle may be inspected. Once inspection is complete, the vehicle may be unloaded from the structure. In example implementations, the structure is located relative to the wheeled vehicle such that the inspected vehicle is unloaded from the structure during travel of the wheeled vehicle past the inspected vehicle. The wheeled vehicle may transport the structure to the site of another vehicle to be inspected.

32 Claims, 15 Drawing Sheets

(56) References Cited

U.S. PATENT DOCUMENTS 4,981,318 A * 1/1991 Doane ..... B60P 3/14 296/182.1
5,317,503 A 5/1994 Inoue
5,343,628 A 9/1994 Ham
5,392,388 A 2/1995 Gibson
5,657,233 A 8/1997 Cherrington et al.
5,673,025 A 9/1997 Refugio et al.
D396,455 S 7/1998 Bier
5,833,294 A * 11/1998 Williams ..... B60P 3/14 296/24.32
5,839,112 A 11/1998 Schreitmueller et al.
5,853,215 A * 12/1998 Lowery ..... B05B 16/40 296/24.32
6,052,631 A 4/2000 Busch et al.
D461,822 S 8/2002 Okuley
6,554,183 B1 4/2003 Sticha et al.
6,843,599 B2 1/2005 Le et al.
6,920,197 B2 * 7/2005 Kang et al. ..... G01V 5/0008 378/198
7,089,592 B2 8/2006 Adjaoute
7,331,133 B2 2/2008 Bauernfeind
7,497,618 B2 3/2009 Chen et al.
7,602,143 B2 * 10/2009 Capizzo ..... B60K 15/063 104/34
7,636,676 B1 12/2009 Wolery et al.
7,889,931 B2 * 2/2011 Webb ..... G01N 21/8806 382/141
7,974,859 B1 7/2011 Hopkins
8,061,752 B2 * 11/2011 Ohnstad ..... B62D 63/061 296/26.15
8,095,394 B2 1/2012 Nowak et al.
8,131,417 B2 3/2012 Picard
8,151,209 B2 4/2012 Law et al.
8,311,856 B1 11/2012 Hanson et al.
8,335,606 B2 12/2012 Mian et al.
8,407,139 B1 3/2013 Palmer
8,478,480 B2 7/2013 Mian et al.
8,650,068 B2 2/2014 Esser et al.
8,712,893 B1 4/2014 Brandmaier et al.
8,799,034 B1 8/2014 Brandmaier et al.
D722,606 S 2/2015 Stroupe et al.
8,954,226 B1 2/2015 Binion et al.
D726,741 S 4/2015 Lee et al.
D727,928 S 4/2015 Allison et al.
9,020,096 B2 * 4/2015 Allman ..... G01V 5/0008 378/57
9,291,544 B1 3/2016 Boyer et al.
9,292,544 B2 3/2016 Binstock et al.
9,791,590 B2 * 10/2017 Morton ..... G01V 5/0016
2001/0041993 A1 11/2001 Campbell
2002/0055861 A1 5/2002 King et al.
2002/0072975 A1 6/2002 Steele et al.
2002/0120475 A1 8/2002 Morimoto
2002/0133721 A1 9/2002 Adjaoute
2002/0158968 A1 * 10/2002 Leitgeb ..... H04N 7/183 348/151
2002/0161533 A1 * 10/2002 Uegaki ..... G06Q 10/10 702/35
2003/0028296 A1 2/2003 Miller
2003/0112263 A1 6/2003 Sakai
2003/0120519 A1 6/2003 Candos
2003/0154111 A1 8/2003 Dutra et al.
2003/0233261 A1 12/2003 Kawahara et al.
2004/0039577 A1 2/2004 Roan et al.
2004/0044549 A1 3/2004 Loop
2004/0103010 A1 5/2004 Wahlbin et al.
2004/0128155 A1 7/2004 Vaidyanathan et al.
2004/0133317 A1 7/2004 Hayakawa et al.
2004/0186744 A1 9/2004 Lux
2005/0046597 A1 3/2005 Hutchison et al.
2005/0083413 A1 4/2005 Reed et al.
2005/0108065 A1 5/2005 Dorfstatter
2005/0125117 A1 6/2005 Breed
2005/0131596 A1 6/2005 Cherrington et al.
2005/0146604 A1 7/2005 Shinada
2005/0251427 A1 11/2005 Dorai et al.
2006/0114531 A1 6/2006 Webb et al.
2006/0132291 A1 6/2006 Dourney et al.
2006/0155616 A1 7/2006 Moore et al.
2006/0200307 A1 9/2006 Riess
2007/0061109 A1 3/2007 Wilke et al.
2007/0100669 A1 5/2007 Wargin et al.
2007/0247331 A1 10/2007 Angelis et al.
2007/0250232 A1 10/2007 Dourney et al.
2008/0046261 A1 2/2008 Cunningham
2008/0189142 A1 8/2008 Brown et al.
2008/0222005 A1 9/2008 Schickler
2008/0267487 A1 10/2008 Sid
2008/0281658 A1 11/2008 Siessman
2009/0002364 A1 1/2009 Witte, II
2009/0015585 A1 1/2009 Klusza
2009/0018859 A1 1/2009 Purifoy et al.
2009/0092336 A1 4/2009 Tsurumi
2009/0138290 A1 5/2009 Holden
2009/0150200 A1 6/2009 Siessman
2009/0265193 A1 10/2009 Collins et al.
2009/0290787 A1 11/2009 Stevens et al.
2009/0318121 A1 12/2009 Marumoto
2010/0057498 A1 3/2010 Stephen et al.
2010/0214797 A1 8/2010 Wang et al.
2010/0293114 A1 11/2010 Khan et al.
2010/0316288 A1 12/2010 Ip et al.
2011/0022489 A1 1/2011 Hallowell et al.
2011/0026673 A1 2/2011 Mastronardi et al.
2011/0041088 A1 2/2011 Mason et al.
2011/0060648 A1 3/2011 Weaver et al.
2011/0093159 A1 4/2011 Boling et al.
2011/0209074 A1 8/2011 Gill et al.
2011/0218825 A1 9/2011 Hertenstein
2011/0264582 A1 10/2011 Kim et al.
2011/0313936 A1 12/2011 Sieger
2011/0313951 A1 12/2011 Cook
2012/0029759 A1 2/2012 Suh et al.
2012/0109660 A1 5/2012 Xu et al.
2012/0131504 A1 5/2012 Fadell et al.
2012/0136802 A1 5/2012 McQuade et al.
2012/0245767 A1 9/2012 Beggs et al.
2012/0297337 A1 11/2012 St. Denis et al.
2013/0080291 A1 3/2013 Musuluri
2013/0177134 A1 * 7/2013 Tay ..... G01V 5/0016 378/57
2013/0317861 A1 11/2013 Tofte et al.
2013/0325753 A1 12/2013 Sullivan et al.
2014/0074865 A1 3/2014 Zobrist et al.
2014/0081876 A1 3/2014 Schulz
2014/0082563 A1 3/2014 Kim et al.
2014/0085086 A1 3/2014 Knapp et al.
2014/0095339 A1 4/2014 Cooke
2014/0201022 A1 7/2014 Balzer
2014/0316825 A1 10/2014 Van Dijk et al.
2015/0012169 A1 1/2015 Coard
2017/0147991 A1 * 5/2017 Franke ..... G06Q 10/20

FOREIGN PATENT DOCUMENTS

CN 204506654 * 7/2015
CN 204586638 * 8/2015
CN 204712944 * 12/2015
DE 4023415 * 2/1991
DE 4023415 A1 2/1991
DE 102010015566 B4 10/2013
EP 382673 A2 3/2000
EP 982673 A2 3/2000
GB 2468659 A 9/2010
JP 11291846 A 10/1999
WO 8909386 A1 10/1989
WO 1989009386 A1 10/1989
WO 2006047266 A1 5/2006
WO 2012082700 6/2012
WO 2012082700 A1 6/2012
WO 2013105904 A1 7/2013

(56) References Cited

FOREIGN PATENT DOCUMENTS

OTHER PUBLICATIONS

English Abstract and English Machine Translation of Description and Claims of CN204712944U.*
English Abstract and English Machine Translation of Description and Claims of CN204506654U.*
Aug. 24, 2016—(US) Non-Final Office Action—U.S. Appl. No. 14/933,228.
Dec. 5, 2016—(US) Final Office Action—U.S. Appl. No. 14/561,918.
Nov. 10, 2016—(US) Office Action—U.S. Appl. No. 15/271,908.
Nov. 17, 2016—(US) Notice of Allowance—U.S. Appl. No. 14/933,228.
Nov. 9, 2016—(US) Final Office Action—U.S. Appl. No. 14/562,036.
Oct. 20, 2016—(US) Office Action—U.S. Appl. No. 13/728,539.
Apr. 17, 2017—(US) Non-Final Office Action—U.S. Appl. No. 14/465,475.
Apr. 26, 2017—(US) Non-Final Office Action—U.S. Appl. No. 14/561,918.
Jul. 6, 2017—(US) Non-Final Office Action—U.S. Appl. No. 15/598,549.
May 24, 2017—(US) Non-Final Office Action—U.S. Appl. No. 14/562,036.
May 4, 2017—(US) Final Office Action—U.S. Appl. No. 13/728,539.
Sep. 21, 2017—(US) Final Office Action—U.S. Appl. No. 14/465,475.
Oct. 13, 2017—(US) Office Action—U.S. Appl. No. 14/561,918.
Oct. 24, 2017—(US) Final Office Action—U.S. Appl. No. 14/562,036.
Oct. 25, 2017—(US) Non-Final Office Action—U.S. Appl. No. 15/623,660.
Oct. 27, 2017—(US) Non-Final Office Action—U.S. Appl. No. 15/705,407.
Nov. 8, 2017—International Search Report and Written Opinion Appn PCT/US17/48618.
Jan. 9. 2018—(US) Non-Final Office Action—U.S. Appl. No. 14/465,475.
Mar. 14, 2018—(US) Non-Final Office Action—U.S. Appl. No. 14/561,918.
"Fender Bender—Nationwide Introduces Automated Mobile Hail Estimating," retrieved from www.fenderbender.com/articles/4847-nationwide-introduces-automated-mobile-hail-estimating on Apr. 29, 2015.
Jun. 13, 2016—(US) Non-Final Office Action—U.S. Appl. No. 14/465,475.
Jun. 16, 2016—(US) Non-Final Office Action—U.S. Appl. No. 14/561,918.
Jun. 16, 2016—(US) Non-Final Office Action—U.S. Appl. No. 14/562,036.
May 13, 2016—(US) Final Office Action—U.S. Appl. No. 13/728,539.
Oct. 27, 2016—(US) Non-Final Offce Action—U.S. Appl. No. 14/465,475.
Aug. 24, 2017—(US) Notice of Allowance—U.S. Appl. No. 15/598,549.
Mar. 15, 2018—(US) Notice of Allowance—U.S. Appl. No. 13/728,539.
Mar. 21, 2018—(US) Non-Final Office Action—U.S. Appl. No. 14/562,036.
Apr. 6, 2018—(US) Final Office Action—U.S. Appl. No. 15/705,407.
May 3, 2018—Final Office Action—U.S. Appl. No. 15/623,660.
Jul. 10, 2018—US) Final Office Action—U.S. Appl. No. 14/465,475.
"Nationwide Introduces Automated Mobile Hail Estimating." Apr. 29, 2015. Retrieved from [https://www.fenderbender.com/articles/print/4847-nationwide-introduces-automated-mobile-hail-estimating] on Jun. 15, 2017.
Automatic surface inspection of vehicles. Franke, R., Schulte, M., Bothe, T. et al. ATZ Prod Worldw (2010) 3: 12. <https://doi.org/10.1007/BF03224230>.
Innovation in Optical Measuring Technology. p. 6. tech transfer—Gateway2Innovation. Apr. 2010.
Internet archive waybackmachine, https://archive.org/web/ for http://www.puspakom.com.my.*
"Oracle Depot Repair User Guide"—Retrieved from [http://docs.oracle.com/cd/E18727_01/doc.121/e13606/T231848T346845.htm#T346883] on Jun. 25, 2014.
"SilverDAT® II"—Retrieved from [http://www.dat.de/en/offers/information-services/silverdat-ii.html] on Jun. 25, 2014.
"Estimate and manage repairs and process claims"—Retrieved from [http://www.eurotaxglass.com/products-and-services/estimate-and-manage-repairs-and-process-claims/] on Jun. 25, 2014.
Jun. 8, 2015—(US) Non-Final Office Action—U.S. Appl. No. 13/458,388.
Oct. 16, 2015—(US) Final Office Action—U.S. Appl. No. 13/458,388.
Oct. 23, 2015—(US) Non-Final Office Action—U.S. Appl. No. 13/728,539.
Apr. 27, 2016—(US) Notice of Allowance—U.S. Appl. No. 13/458,388.
Puspakom Premier Services—Mobile Inspection Unit. Retrieved from [http://www.puspakom.com.my/en/inspections-a-services/range-of-services/premier-mobile-inspection.html] on Mar. 31, 2016.
Mobile Vehicle Inspection Unit for ADAC. Retrieved from [http://www.fischerpanda.de/mobile-vehicle-inspection-unit-for-adac.htm] on Mar. 31, 2016.
Motorola MC75 | Mobile pickup and delivery software (POD) with automated fuel truck management, Vehicle Inspection Forms, Mar. 5, 2010 by Admin, 28 pages, http://www.bizspeed.com/tag/motorola-mc75/.

* cited by examiner

MOBILE INSPECTION FACILITY

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

Aspects of the disclosure generally relate to article handling. In particular, various aspects of the disclosure relate to a wheeled vehicle having a structure attached thereto and configured to acquire within the interior of the structure a vehicle to be inspected.

BACKGROUND

Assessing the damage that has occurred to an object, such as a vehicle following a collision, can be a time consuming and resource intensive process. With respect to a damaged vehicle, in order to assess the damage, the vehicle may be taken to a repair facility for an assessment of the damage. If the vehicle is undriveable, it may be towed to the repair facility or, alternatively, a damage assessor may be dispatched to the location of the vehicle in order to assess the damage.

BRIEF SUMMARY

The following presents a simplified summary of the present disclosure in order to provide a basic understanding of some aspects of the disclosures. This summary is not an extensive overview of the disclosures. It is not intended to identify key or critical elements or to delineate the scope of the claimed subject matter. The following summary merely presents some of the concepts described in further detail below in a simplified form as a prelude to those concepts.

Aspects of the disclosure involve a mobile inspection facility that can be driven to the location of a damaged object (such as, e.g., a vehicle) in order to assess the damage that has occurred to the object. The mobile inspection facility may include an interior chamber having an area at which the object may be positioned as well as a collection of sensing devices aimed at that area. Once at the location, the mobile inspection facility may receive the object within its interior such that the object is positioned at the area. The sensing devices may then operate to generate sensor data related to the damaged object, and that sensor data may be analyzed to identify the damage that has occurred to the object. In some aspects, the sensing devices may operate to generate date for the damaged object while the mobile inspection facility is moving, e.g., driven past the damage object.

In some example implementations, the mobile inspection facility may be configured to analyze a damaged vehicle. Accordingly, the housing and its interior chamber may be sized and shaped to receive and house a damaged vehicle undergoing an inspection. The housing may also include one or more openings that are also sized and shaped to permit passage of the vehicle into the interior chamber of the housing. In some example implementations, the housing may be positioned on a lateral side of the vehicle and included openings in each of a front wall and a rear wall that permits the mobile inspection facility to drive past the vehicle such that the vehicle passes through the openings into and out of the interior chamber of the housing.

A damage assessment system may receive and analyze the sensor data generated by the sensing devices in order to identify the damage that has occurred to the object. The damage assessment system may also estimate a cost to repair or replace the object based on the damage identified. The damage assessment system may reside remotely relative to the mobile inspection facility or be included as part of the mobile inspection facility.

Additional aspects will be appreciated upon review of the additional disclosures described in more detail below.

BRIEF DESCRIPTION OF THE DRAWINGS

The present disclosure is illustrated by way of example and is not limited in the accompanying figures in which like reference numerals indicate similar elements and in which.

DETAILED DESCRIPTION

In accordance with various aspects of the disclosure, methods, computer-readable media, and apparatuses are disclosed in which a damaged object may be inspected using a mobile inspection facility that can be driven to the location of the damaged object in order to assess the damaged that has occurred to the object. In certain aspects, the mobile inspection facility is configured to inspect the damage that has occurred to a vehicle, e.g., following an accident. Accordingly, the mobile inspection facility may include an inspection apparatus having a size sufficient to receive a vehicle within an interior space having sensing devices configured to inspect the vehicle and generate inspection data for the vehicle. The mobile inspection facility may also be configured to transmit the inspection data to a remote server that, in response, analyzes the inspection data received to assess the damage that has occurred to the object and estimate a cost to repair or replace the damaged object. Additionally or alternatively, the mobile inspection facility itself may be configured to assess the damaged to the object based on the inspection data generated and estimate a cost to repair or replace the damaged object.

As described in further detail below, utilizing a mobile inspection facility to inspect a damaged object may be particularly advantageous in multiple circumstances. In one scenario, for example, the damaged object may not be able to be moved, e.g., in the case where a vehicle has been damaged in an accident and is undriveable. In another scenario, multiple damaged objects may all be located at the same place, e.g., following a catastrophe or natural disaster. In each of these scenarios, it may be more efficient to bring an inspection facility to the damaged object rather than bring the damaged object to the inspection facility. Where multiple vehicles are damaged for example (e.g., following a hail storm) it would be more efficient to deliver a mobile inspection facility to the area where the hail storm occurred rather than have each vehicle travel to a fixed mobile inspection facility. These and other advantages will be further appreciated with the benefit of the additional disclosures below.

The automated process may utilize various hardware components (e.g., processors, communication servers, memory devices, sensors, etc.) and related computer algorithms to inspect a damaged object, analyze the inspection data obtained, assess the damage that has occurred to the object, estimate a cost to repair or replace the damaged object, and generate and transmit a damage report file associated with the damaged object. The damage report file that may include information regarding the damage assessment, an estimated cost to repair or replace the damaged object, approved vendors and available times for repairingor replacing the damaged object, and payment to an individual associated with the damaged object as compensation for the damage.

Figure 1:
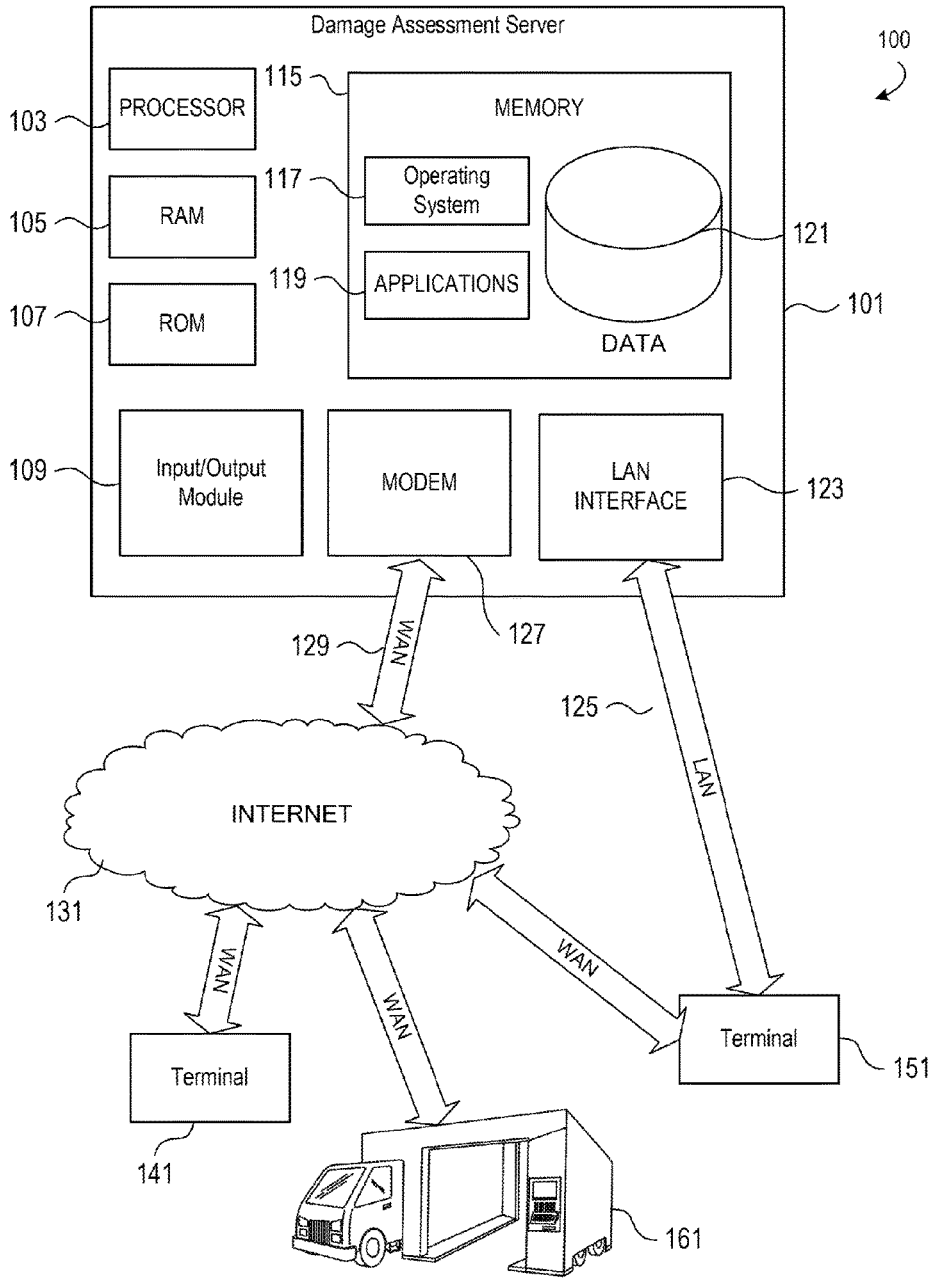
FIG. 1 shows an illustrative operating environment in which various aspects of the disclosure may be implemented.

FIG. 1 illustrates a block diagram of system 100 for inspecting and assessing damage that has occurred to an object that may be used according to an illustrative embodiment of the disclosure. The system 100, in this example, includes a damage assessment system 101 which may have a processor 103 for controlling overall operation of the damage assessment system 101 and its associated components, including RAM 105, ROM 107, input/output module 109, and memory 115.

Input/output module 109 may include a microphone, keypad, touch screen, and/or stylus through which a user of the damage assessment system 101 may provide input, and may also include one or more of a speaker for providing audio output and a video display device for providing textual, audiovisual and/or graphical output. Software may be stored within memory 115 to provide instructions to processor 103 for enabling the damage assessment system 101 to perform various functions. For example, memory 115 may store software used by the damage assessment system 101, such as an operating system 117, application programs 119, and an associated database 121. Processor 103 and its associated components may allow the damage assessment system 101 to run a series of computer-readable instructions to, e.g., receive inspection data generated during an inspection of a damaged object, analyze the inspection data to assess the damage that has occurred to the object, estimate a cost to repair or replace the damaged object, and generate a damage report file for the damaged object based on the damage analysis and the estimated repair/replace cost. In addition, the damage assessment system 101 may include computer-readable instructions to determine an approved list of vendors for replacing and/or repairing the damaged object and schedule appointments with those vendors repair/replace the damaged object.

The damage assessment system 101 may operate in a networked environment supporting connections to one or more remote computers, such as terminals 141 and 151 and mobile inspection facility 161. The terminals 141 and 151 may be personal computers or servers that include some or all of the elements described above with respect to the damage assessment system 101. The mobile inspection facility may also include some or all of the elements described above with respect to the damage assessment system 101. Also, terminal 141 and/or 151 and mobile inspection facility 161 may include sensing devices such as cameras and other sensors that allow inspection of a damaged object. The network connections depicted in FIG. 1 include a local area network (LAN) 125 and a wide area network (WAN) 129, but may also include other networks. When used in a LAN networking environment, the damage assessment system 101 is connected to the LAN 125 through a network interface or adapter 123. When used in a WAN networking environment, the damage assessment system 101 may include a modem 127 or other means for establishing communications over the WAN 129, such as the Internet 131 or a cellular network. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application programs 119 used by the damage assessment system 101 according to an illustrative embodiment of the disclosure may include computer executable instructions for invoking functionality related to quickly and accurately (e.g., in seconds or minutes) inspect the damage object, analyze the inspection data generated during the inspection to assess the damage that has occurred to the object, and generate a damage report. In one embodiment, the inspection and analysis processes discussed herein may occur in ten minutes or less.

The damage assessment system 101, terminals 141 or 151, and/or mobile inspection facility 161 may also include various other components, such as a battery, speaker, and antennas (not shown).

The disclosure is operational with numerous special purpose computing devices, systems, and environments. As noted above and described in further detail below, the system 100 for inspecting and assessing damage that has occurred to an object includes various devices and components programmed with instructions that, when executed, cause devices and components to perform, in combination, functionality associated with receiving inspection data generated during an inspection of a damaged object, analyzing the inspection data to assess the damage that has occurred to the object, estimating a cost to repair or replace the damaged object, and generating a damage report file for the damaged object based on the damage analysis and the estimated repair/replace cost.

Aspects of the disclosure may be described in the context of computer-executable instructions. Sets of instructions may be grouped according to the particular functionality those instructions provide. Generally, instruction sets include routines, programs, objects, components, data structures, etc. that perform particular tasks or implement particular data types. The disclosure may also be practiced in distributed computing environments where tasks are performed by remote processing devices that are linked through a communications network, e.g., a mobile inspection facility for inspecting a damaged object and a damage assessment system located remotely relative to the mobile inspection facility but is in signal communication with the mobile inspection facility via one or more networks. The instruction sets may be located in both local and remote non-transitory computer storage media including memory storage devices, such as a hard disk, random access memory (RAM), and read only memory (ROM). During execution, instructions and/or instruction sets may be loaded into one or more of these types of storage devices for execution.

Figure 2:
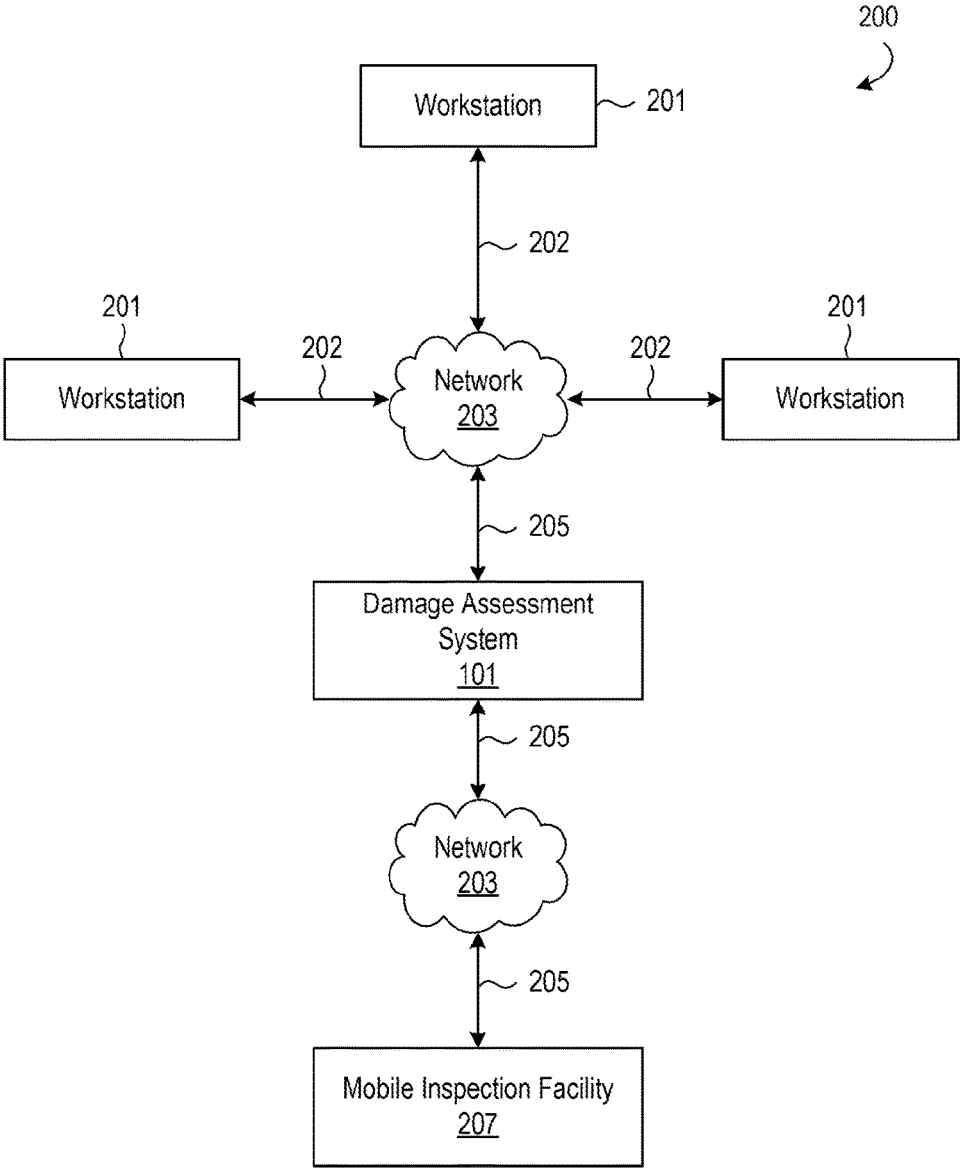
FIG. 2 shows a block diagram of an example of an implementation of a system for implementing certain aspects of the present disclosure.

Referring to FIG. 2, a system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the damage assessment system 101. In certain embodiments, workstations 201 may different instruction sets used by the damage assessment system 101 for receiving inspection data generated during an inspection of a damaged object, analyzing the inspection data to assess the damage that has occurred to the object, estimating a cost to repair or replace the damaged object, and generating a damage report file for the damaged object based on the damage analysis and the estimated repair/replace cost. In system 200, damage assessment system 101 may be any suitable server, processor, computer, or data processing device, or combination of the same.

The network 203 may be any suitable wired or wireless network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and the damage assessment system 101, such as network links, dial-up links, wireless links, hard-wired links, etc.

As seen in FIG. 2, the damage assessment system 101 may also be in signal communication via a network 203 and communication links 205 with a mobile inspection facility 207 configured to inspect a damage object. The mobile inspection facility 207 may thus communicate with the damage assessment system 101 to transmit inspection data generated during an inspection of a damaged object as well as to receive commands for controlling one or more of the sensing devices of the mobile inspection facility.

Figure 3:
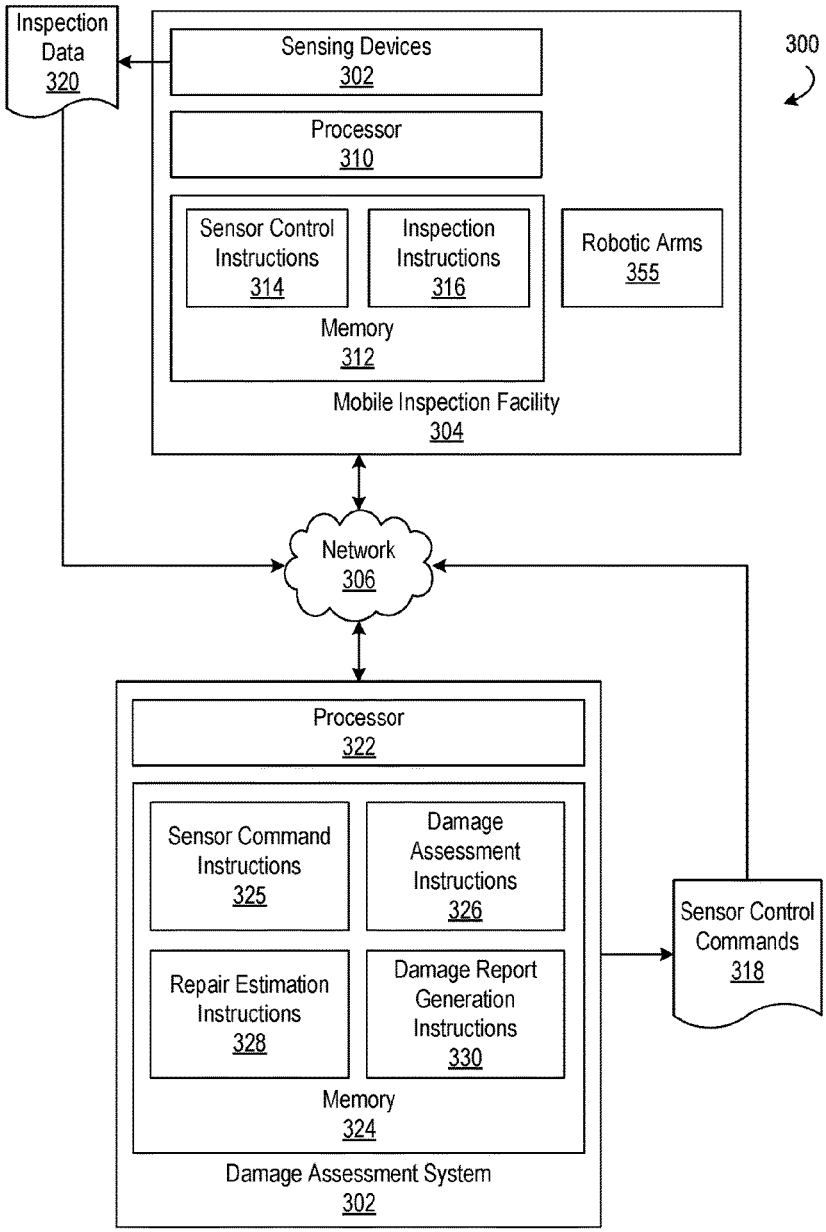
FIG. 3 shows another block diagram of an example of an implementation of a system for implementing certain aspects of the present disclosure.

FIG. 3 shows another block diagram of a system 300 configured to implement aspects of the present disclosure. The system 300, in this example, includes a damage assessment system 302 and a mobile inspection facility 304. The damage assessment system 302 and mobile inspection facility 304, in this example, are in signal communication with each other via a network 306.

The mobile inspection facility 304 includes a set of sensing devices 308, one or more processors 310, and memory 312 storing computer-readable instructions that, when executed by one or more of the processors, cause the mobile inspection facility to carry out aspects of the inspection process. The memory 312 of the mobile inspection facility 304, in this example, includes sensor control instructions 314 and inspection instructions 316. The sensor control instructions 314, in this example, are configured to control one or more of the sensing devices 308. Accordingly the sensor control instructions 314 may include subsets of instructions wherein each subset of instructions is configured to control a particular sensing device of the mobile inspection facility 304. Control instructions may include, for example, instructions to activate/deactivate the sensor, move the sensor to a particular position relative to the damage object, take a sensor reading, or transmit a sensor reading (e.g., to the damage assessment system 302). The inspection instructions 316, in this example, are configured to carry out an inspection of the damaged object. The inspection instructions 316 may invoke the sensor control instructions 314 during an inspection of a damage object. The inspection instructions 316 may, for example, specify a sequence for the sensing devices 308 during an inspection and invoke the subsets of sensor control instructions 314 according to that sequence. The inspection instructions 316 may also be configured to analyze sensor readings obtained by one or more of the sensing devices 308 during the inspection such that the inspection sequence depends upon those sensor readings. The inspection instructions 316 may also include instructions configured to initiate an inspection of a damage object. For example, when a vehicle is received with the area, one or more sensors (e.g., pressure sensors under the wheels of the vehicle, proximity sensors that detect the presence of the body of the vehicle, etc.) may activate the system and/or indicate that the inspection process is ready to begin. Accordingly the inspection instructions 316 may be configured such that the inspection process begins upon receipt of one or more signals from these sensors indicating an object has been received at the appropriate inspection area within the mobile inspection facility 304. The mobile inspection facility may also receive sensor control commands 318 from the damage assessment system 302. Accordingly, the inspection instructions 316 may be configured to receive these sensor control commands 318 and, in turn, invoke the corresponding sensor control instructions 314 based on those sensor control commands. In this way, the damage assessment system may remotely control one or more of the sensing devices 308 at the mobile inspection facility 304 (e.g., remotely move a sensing device to a different orientation or position, remotely trigger a sensor reading, and the like). In addition to initiating the inspection process and facilitating operation of the sensing devices during the inspection, the inspection instructions 316 may be configured to bundle the inspection data 320 obtained during the inspection and initiate transmission of that inspection data to the damage assessment system 302.

The damage assessment system 302, in this example, also includes one or more processors 322 and memory 324 storing computer-readable instructions that, when executed by one or more of the processors, cause the damage assessment system to carry out aspects of the inspection process. The memory 324 of the damage assessment system 302, in this example, includes sensor command instructions 325, damage assessment instructions 326, repair estimation instructions 328, and damage report generation instructions 330. The sensor command instructions 325, in this example, are configured to, automatically or in response to user input received at the damage assessment system 302, transmit instructions to the mobile inspection facility 304 for remote control of the sensing devices 308 during an inspection of a damaged object. As an example, a user operating one or more input devices (e.g., a joystick) at the damage assessment system 302 may remotely control an imaging device at the mobile inspection facility 304. The sensor command instructions 325, in this example, may be configured to translate the user input received into commands for the imaging device, e.g., commands for capturing a still or moving image, commands for reorienting the imaging device, commands for repositioning the imaging device, and the like. Additional examples will be appreciated with the benefit of this disclosure. Although not shown in FIG. 3, a damage assessment system (such as the damage assessment system 302) may also include command instructions for remotely controlling other components of the mobile inspection facility, e.g., a robotic arm 355 that may be remotely controlled to grasp and move components of the object under inspection, a lift to raise or lower the object, a conveyor or turn table to move or rotate the object. The damage assessment system 302 may likewise transmit these additional command instructions to the mobile inspection facility which, in response, may invoke the appropriate component control instructions based on the commands received. The damage assessment instructions 326, in this example, are configured to analyze the inspection data 320 received from the mobile inspection facility 304 in order to assess the damage that has occurred to the object under inspection. Assessment of the damage that has occurred to the object under inspection based on the received inspection data 320 will be discussed in further detail below. In general, however, the damage assessment instructions 326, in this example, is configured to identify the various portions and/or components of the object that have been damaged, the type of the damage, and the extent of the damage. With respect to a damaged vehicle, for example, the portions and components that may be damaged include the body panels of the vehicle, the front and rear windshields, the external mirrors, the front and rear lighting elements, the windows, and other external and internal components. The types of damage that may be identified with respect to a damaged vehicle include dents, punctures, tears, cracks, breaks, and the like. The extent of these types of damage may include, e.g., the depth and diameter of a dent, the length of a crack, and the like. The repair estimation instructions 328, in this example, are configured to estimate a cost to repair or replace the damage item based on the damage assessment. Estimating a cost to repair or replace the damaged object will be discussed in further detail below. In general, however, the repair estimation instructions 328 may, for example, estimate a cost to repair or replace each damaged component of the object (e.g., parts and labor costs) as well as estimate an overall cost to repair or replace the damaged object based on the individual estimates for the individual components. The damage report generation instructions 330, in this example, are configured to generate a file having one or more of the inspection data received from the mobile inspection facility 302, information associated with the damage assessment, and information associated with the estimated cost to repair or replace the damaged object. The damage report may also include information identifying a payment made to an individual associated with the damaged object (e.g., a vehicle owner) as compensation for the damage as well as information identifying one or more vendors or service provides at which the individual may have the damage objected repaired or replace. Accordingly, although not shown in FIG. 3, a damage assessment system may also include instructions for initiating a payment (e.g., an electronic payment) to an individual associated with a damage object as well as identifying vendors or services providers, within the vicinity of the individual, that may repair or replace the damaged object. Additional examples will be appreciated with the benefit of this disclosure.

The mobile inspection facility 304 may be dispatched in response to a first notification of loss associated with a damaged object. The notification may be an automated notification of an accident from a telematics device, smart phone, and/or other device to a dispatch center. In certain embodiments, if the accident is associated with a vehicle (e.g., car, truck, boat, etc.) the telematics device and/or smart phone may include an impact sensor that automatically transmits a notification of the accident involving the vehicle to the dispatch center when certain impact parameters are detected. Additional information such as speed, braking or acceleration for the time period immediately preceding and immediately subsequent to the accident as well as vehicle identifying information or insured information also may be transmitted by the telematics device and/or smart phone to the dispatch center. The vehicle identifying information may include license plate number, vehicle identification number, and/or vehicle make/model.

As noted above, the inspection process may automatically begin once the damaged object has been received at the inspection area of the mobile inspection facility. In other embodiments, the inspection process may be initiated by the swipe of an insurance card or card including identification information (such as a credit card) through a sensor or card reader of the mobile inspection facility 302. The insurance card or other card including identification information may include information related to the identity of the claimant (e.g., name, date of birth, terms of active insurance policies, etc.). In other embodiments where the damaged object is a vehicle, the inspection process may be initiated by having a scanner at the mobile inspection facility scan a license plate and/or vehicle identification number (VIN).

As noted above, the mobile inspection facility 304 may use one or more sensing devices 308 that are in signal communication with the damage assessment system 302. The sensing devices 308 may function simultaneously or sequentially (e.g., the damage object may be moved from one sensor station to another) to gather data about the damage that has occurred to the object under inspection.

The sensing devices 308 may include various types of cameras (e.g., movable cameras, etc.) for taking optical digital images and/or other computing/mechanical devices that may make laser and/or tactile measurements. The sensing devices 308 may also measure the interaction of pressure waves (e.g., sound waves) or X-rays on the object to analyze the damage. In yet other embodiments, various types of imaging technologies may be used to analyze the damaged object. For instance, magnetic resonance imaging (MRI), infrared imaging, 3D imaging technologies (e.g., holographic imaging, etc.), and/or various types of tomography may be used to image the damaged object. Accordingly the images obtained may include two-dimensional images, three-dimensional images, tomographic images, infrared images, and magnetic resonance images. The sensing devices 308 may also sense fluids such as transmission fluids, brake fluids, engine oil, etc. leaking from the object. In other embodiments, the sensing devices 308 may sense various aspects of tires that are a part of the object (e.g., when the object is a vehicle). For instance, the sensing devices 308 may indicate that a frame associated with a body or a rim associated with a tire of a vehicle is bent.

When the object is a vehicle, one of the sensing devices 308 at the mobile inspection facility 304 may dock with an on-board diagnostic (OBD) or OBD-II system that may be a part of the vehicle's electronics system. The inspection data 320 may thus include the information received via the OBD or OBD-II system. The information recorded by the OBD or OBD-II system may include coolant temperature, engine RPM, vehicle speed, timing advance, throttle position, oxygen sensor readings, mileage, and the like. As noted above, this information may be transmitted to the data assessment system 302 for analysis and assessment of any damage that has occurred to the vehicle.

In addition to gathering information through various sensors, the mobile inspection facility 304 may also include an interface for an individual to input information and/or answer questions (e.g., an automated questionnaire, etc.) regarding prior damage to the object, liability, the circumstances surrounding an accident, and the like.

In some embodiments, a damage assessment system may be configured to detect fraudulent claims. Accordingly a damage assessment system may include fraud detection instructions configured to analyze the inspection data and any other data received with respect to the damaged object and determine whether a claim relating to the damage is likely to be fraudulent. For instance, the automated questionnaire discussed above may also ask about an accident associated with the claim. The answers to the questions regarding the accident may be compared to the actual damage or sensor or OBD-II readings associated with the object under inspection. If determines that there are discrepancies between the actual damage or sensor or OBD-II readings associated with the damaged object as measured by the sensing devices 308 and a description of the damage provided in the answers to the automated questionnaire, then the damage assessment system 302 may provide a notification to initiate an intervention or other action such as to terminate the damage claim. Also, when the damages object is a vehicle, a damage assessment system may compare particulars about the vehicle (e.g., make, model, year of manufacture, VIN, etc.) to previously-obtained vehicle information (e.g., stored in a memory associated with the damage assessment system and/or on file with an entity managing the damage assessment system) in order to detect potential fraud. Further, if the number of false positives for detecting fraud exceeds a predetermined threshold, then the instructions for detecting potential fraud (i.e., the fraud detection algorithms) and/or questions used to detect fraud may be adjusted accordingly.

As another example, the damage assessment system 302 may be able to estimate the speed of the vehicle when accident occurred based on the inspection data 320 received. The speed determined by the damage assessment system 302 may be compared with the speed indicated by an individual in the questionnaire. Finally, the damage assessment system 302 may also be able to estimate the number of people and the positions of each individual in the vehicle when the accident occurred based on the inspection data 320 received. This information may also be compared with the corresponding descriptions indicated by the individual in the questionnaire.

In other aspects, the damage assessment system 302 may be able to interface with other databases/systems. For instance, the damage assessment system 302 may interface with meteorological databases to retrieve the weather conditions at the time of an accident associated. The damage assessment system 302 may also interface with law enforcement databases to retrieve police reports of the accident or with other databases having medical records or other types of records related to people involved in the accident.

Once the analysis of the inspection data 320 is complete, the damage assessment system 302 may then generate a damage report file. In certain aspects, the damage assessment system 302 may automatically generate the damage report file. The damage report file may include the assessment of the damage to the object (e.g., portions or components damaged, the type of damage, and the extent of the damage), approved vendors with available times for repairing and/or replacing the damaged object, a list of parts and part vendors for repairing the damaged object, a list of replacements and replacement sources for the damaged object, various portions or components of the damaged object where repair is not feasible, and information identifying a payment or wire transfer to an individual associated with the damaged object as compensation for the assessed damage to the object. Additionally or alternatively, if the individual associated with the damaged object is provided compensation for the damage to the object, the damage assessment system 302 or the mobile inspection facility 304 may generate a payment card (e.g., a prepayment card) with the compensation amount.

In another aspect of the disclosure, the damage report file may stipulate various terms for settling a claim associated with the damaged object. Such terms may include discounts provided to the individual associated with the damaged object for errors in inspecting the damaged object or assessing the damage that occurred to the damaged object. For instance, the damage report file may provide for a predetermined discount (e.g., a 10% discount on future products and/or services) for any out-of-pocket expense associated with replacing/repairing the damaged object if the damage assessment system 302 does not detect all of the damage associated with the object (e.g., hidden damage) and/or if the estimated cost of repairing or replacing the damaged object is not accurate (e.g., as determined by an adjustor or a third party vendor such as a repair shop). Moreover, once the damage report file has been generated, the information in file may be transmitted to a computing device of an individual associated with the damaged object (e.g., the owner of a damaged vehicle).

In general, the damage report file may resolve all the issues associated with settling a claim involving the damaged object. Additionally or alternatively, if the damage report file does not resolve all the issues (e.g., damage cannot be assessed, there is disagreement between the individual and the claims processor, etc.) or for verification or training associated with settling a claim for the damaged object, the damage assessment system 302 may refer the individual to an adjuster for generating or verifying a finalized estimate of any damage.

The adjuster may, for example, remotely control the sensing devices 308 via the damage assessment system 302 in order to conduct a remote inspection of the damaged object at the mobile inspection facility 304. For example, the sensing devices 308 may be remotely controlled to view the damaged object through a video feed, and various sensing devices (e.g., imaging devices) may be remotely manipulated to capture a desired view using the sensor control commands as described above. For instance, the damage assessment system 302 may transmit sensor control commands 318 to the mobile inspection facility 304 that instruct a sensing device 308 to move to a given angle. Additionally or alternatively, the damaged item may be directly manipulated by remotely controllable manipulators to facilitate inspection of the damaged object from a desired view. For instance, the damage assessment system 302 may transmit control commands to the mobile inspection facility to move robotic arms 355 or lifts that are able to reposition the damaged object itself or components of the damaged object in order to provide a preferred view.

The sensing devices 308 of the mobile inspection facility 304 may generate inspection data 320 that enables the production of holograms (e.g., based on magnetic resonance imaging (MRI) or other techniques using predictive computer-aided design (CAD)-type technologies, etc.) for viewing the damaged object. The holograms may represent three-dimensional images of the damaged object and may provide views of the exterior of the damaged object as well as features internal to the damaged object. For instance, a hologram may provide views of the different components comprising a vehicle's engine that permits analysis in ways that would not be feasible with other imaging techniques.

In some aspects, the damage assessment instructions 326 may utilize manufacturing specifications and/or tolerances data associated with the damaged object. The damage assessment instructions 326 may also cause deletion of any inspection data that are not relevant to the damage assessment, e.g., images and other inspection data that are deemed not relevant based on a comparison to manufacturing specifications/tolerances. The damage assessment system 302 may permit access to the inspection data 320 obtained by the mobile inspection facility 304 or the damage report file generated by the damage assessment system 302 (e.g., by the individual associated with the damaged object). In some embodiments, the damage assessment system 302 may initiate transmission of the payment to either the individual associated with the damaged object or a third-party vendor/service provider (e.g., for repairing/replacing the damaged object).

In other aspects, the damage assessment system 302 may initiate the application of a deductible amount to a claim associated with the damaged object. In addition, the damage assessment system 302 and/or the mobile inspection facility 304 may also automatically generate cross-sell material (e.g., for other products/services) for review while an individual waits for the inspection process, the damage assessment process, and/or the damage report generation process to complete.

Figure 4:
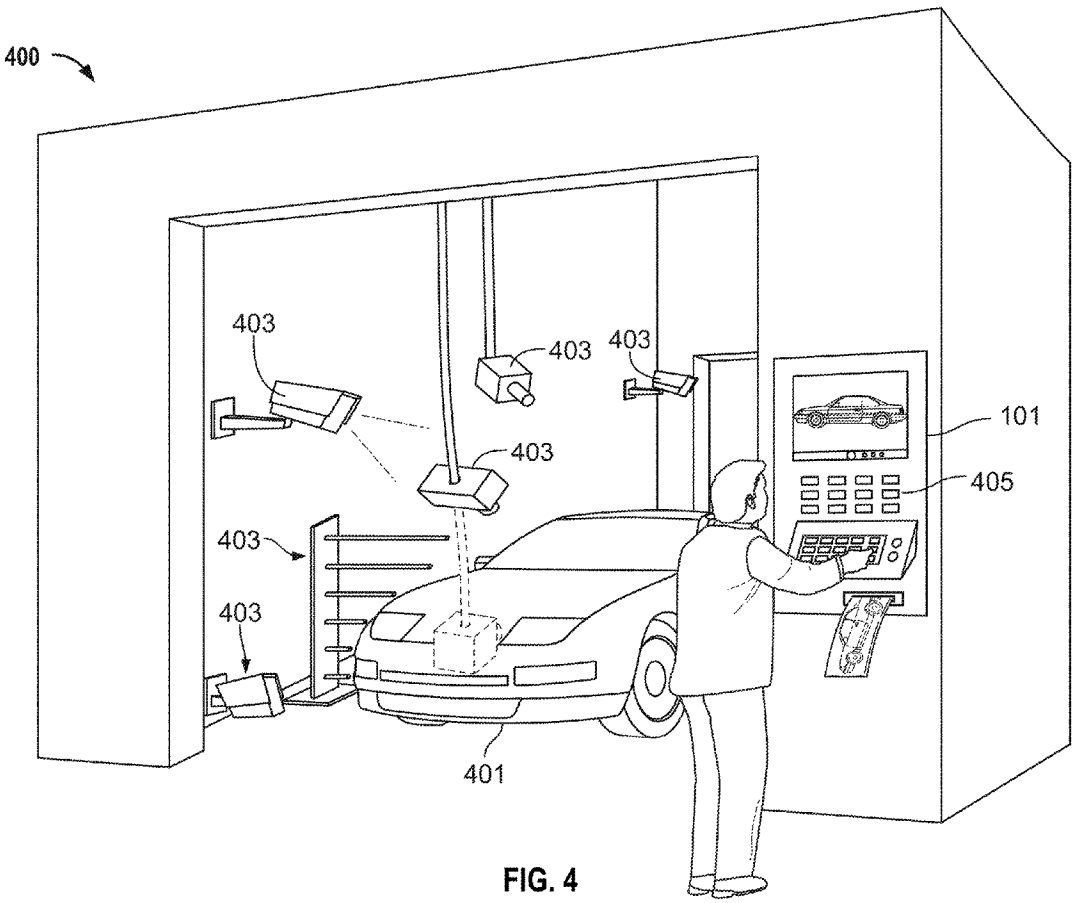
FIG. 4 illustrates an example of an implementation of a facility configured to generate sensor data for a damaged object in accordance with aspects described herein.

FIG. 4 illustrates an example of an inspection facility 400 employing in accordance with various aspects of the present disclosure. FIG. 4 shows an example of how the inspection facility may be used when the object to be inspected is a vehicle 401. In FIG. 4, an owner of vehicle 401 may file a claim for damage to vehicle 401. The owner may provide notification of the claim through any of the various techniques mentioned above, including automatic notification via a telematics device driving to a predetermined location associated with the inspection facility 400. The inspection facility 400 may inspect the vehicle 401 using various sensing devices 403 (e.g., cameras, tactile sensors, ultrasonic sensors, electromagnetic sensors, etc.), which are housed within the inspection facility 400 as shown by way of example in FIG. 4. The inspection facility 400 may transmit to a damage assessment system the inspection data generated by the sensing device 403 which may, in turn, analyze that inspection data in order to determine damage caused to vehicle 401 and generate a damage report file for the vehicle 401. The inspection facility, in this example, also includes a user interface 405 through which a user may perform various activities. For instance, a user may swipe an insurance card at the user interface 405 as well as view/print photos, inspection data, and other information generated by the inspection facility 400 or the damage assessment system in signal communication with the inspection facility.

As seen in FIG. 4, the inspection facility 400, in this example, is a fixed inspection facility. Accordingly the vehicle 401 must be brought to the inspection facility wherever it is located, e.g., driven to the inspection facility, towed to the inspection facility, or otherwise delivered to the inspection facility. As described in further detail below, however, the inspection facility may be mobilized and thus moved to the location of the vehicle where, for example, the vehicle cannot be brought to the inspection facility or it would be more efficient to bring the inspection facility to wherever the vehicle is located in order to perform the inspection.

Figure 5:
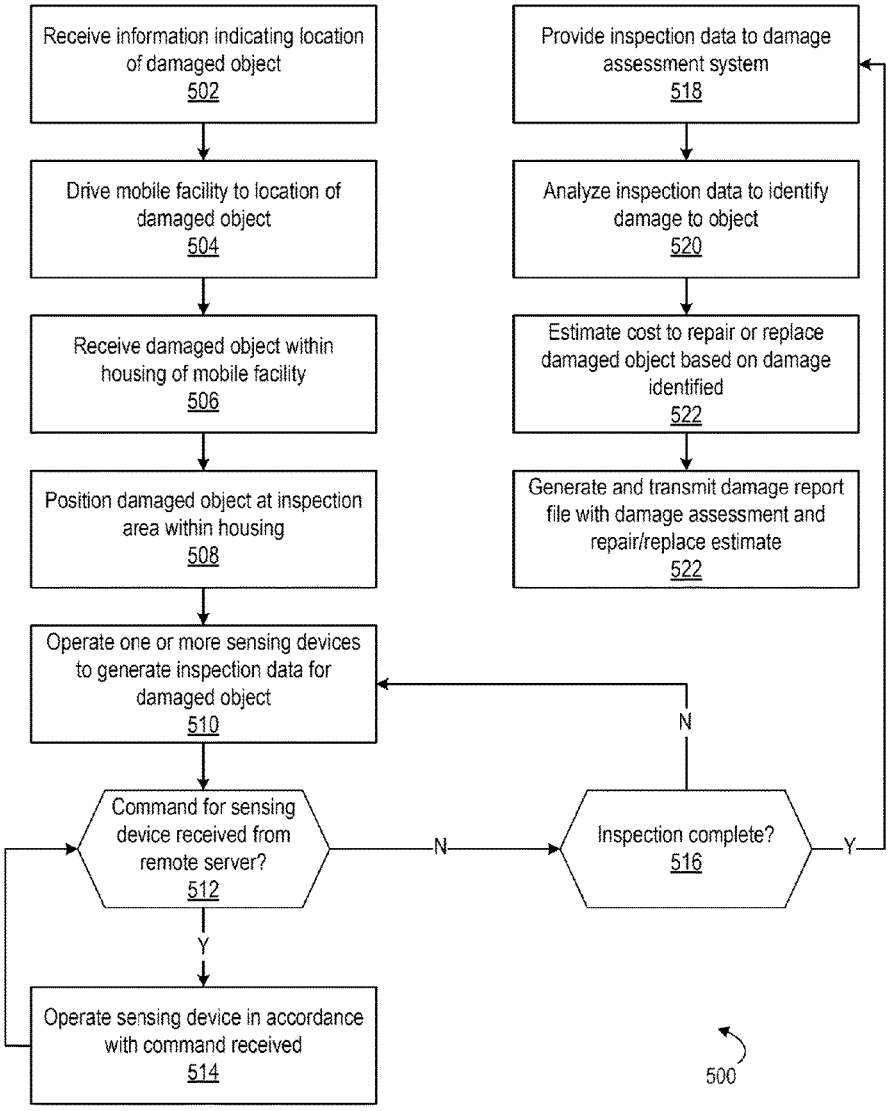
FIG. 5 illustrates a flowchart of example method steps for operating a mobile inspection facility to inspect an object and assess the damage that has occurred to that object in accordance with aspects described herein.

FIG. 5 illustrates a flowchart 500 of example method steps for operating a mobile inspection facility to assess the damage that has occurred to an object in accordance with aspects described herein. Information indicating the location of a damaged object may be received (block 502), e.g., at a dispatch center. This information may be received in various ways. For instance, either an automatic or a manual notification may be transmitted from a communication device operated by an individual associated with the damaged object or the damaged object itself, e.g., a vehicle telematics devices or a collision detection system. After this initial receipt of information indicating the location of a damaged object, the mobile inspection facility may be driven to that location (block 504), and the damaged object may be received within a housing of the mobile inspection facility (block 506). As described in further detail below, the damaged object may be a vehicle and driven into the housing of the mobile inspection facility. Additionally or alternatively, the mobile inspection facility may be configured with openings such that the vehicle may remain stationary and pass through those openings when the mobile inspection facility is driven past the vehicle. Within the housing of the mobile inspection facility, the damaged object is positioned at an inspection area (block 508). The sensing devices of the mobile inspection facility are also positioned within the housing and oriented such that they are aimed at the inspection area. Once positioned at the inspection area within the housing of the mobile inspection facility, the inspection process may begin, and one or more sensing devices of the mobile inspection facility may be operated to generate inspection data for the object under inspection (block 510).

As noted above, the sensing devices of the mobile inspection facility may be remotely controlled. Accordingly, if a command for a sensing device is received from a remote server (block 512:Y), then the selected sensing device may be operated in accordance with the command received (block 514). One or more of the sensing devices may be remotely controlled during the inspection process based on commands received from a remote server. As also noted above, the sensing devices may operate sequentially or in parallel until the inspection process is complete. As also explained above, inspection instructions stored at the mobile inspection facility may control the operation of the sensing devices during the inspection process.

Once the inspection is complete (block 516:Y), the mobile inspection facility may transmit the inspection data generated by the sensing devices to a damage assessment system (block 518). The damage assessment system may analyze the inspection data received in order to assess the damage that has occurred to the object under inspection (block 520) and estimate a cost to repair or replace the object based on the damage identified (block 522). The damage assessment system may also generate a damage assessment report file that includes the damage assessments and the estimated repair or replace costs and transmit the damage assessment report to an individual associated with the object under inspection (block 522). As described in further detail below, the mobile inspection facility itself may additionally or alternatively include instructions for analyzing the inspection data generated by the sensing devices, for estimating repair/replace costs based on the assessed damage, and for generating the damage report file provided to the individual.

The damage assessment instructions may include various algorithms to analyze the inspection data generated by the sensing devices. The inspection instructions may include predefined rules for inspecting particular portions or components of the object under inspection, and the damage assessment instructions may also include predefined rules for analyzing the inspection data generated for those particular portions or components. For instance, if the object under inspection is a vehicle, the damage assessment instructions may utilize object recognition algorithms to determine the make/model of the vehicle and to compare photos of damaged portions or components of the vehicle with photos of similar portions or components of an undamaged vehicle, such as photos obtained from a manufacturer's specification. The object recognition algorithms may track one or many multiple specific points of a portion or component of the vehicle to determine which portions or components may be damaged. For instance, to determine if a door has actually been damaged, the algorithms may track the center of a door to determine if the center is at an appropriate distance from an edge of the door. This analysis may also be used to determine the extent or level of damage to the car door (e.g., whether the door may be repaired or should instead be replaced). As another example, one or more of the sensing devices may utilize infrared imaging technology to image the temperature of various components within a vehicle's engine. By cross-referencing the temperature profile with the heat tolerances set by the manufacturer, the damage assessment instructions may determine that the vehicle 401 may need certain engine components replaced (e.g., a new timing belt, muffler, etc.). As yet another example, tactile sensing devices that contact the contour of a vehicle may determine that certain body parts associated with the vehicle have dents and/or scratches that require repair.

In other aspects, the object recognition algorithms used to determine the make/model of the vehicle may be defined by manufacturer or after-market specifications and appropriate tolerances. For instance, a manufacturer specification may define the exact dimensions of a car door and/or an engine part. Because each manufacturer specification may have different definitions and tolerances, the damage assessment instructions may retrieve the appropriate specification based on predefined criteria.

In analyzing the inspection data obtained for the object under inspection, the damage assessment instructions may also determine the level or extent of particular damage. For example, the damage assessment instructions may determine whether the damage to the object is small enough to be repaired or large enough to require replacement of the object and/or a part or component of the object.

As noted above, the damage report file may include information identifying the type of damage assessed, the extent of the damage, and estimated repair or replace information that may be cross-referenced against accessible pricing information. For instance, where a vehicle is damaged, the damage assessment instructions may access pricing information for replacing the vehicle or a component of the vehicle as well as pricing information for repairing the damage to the vehicle. The pricing information may be stored in internal databases associated with the mobile inspection facility and/or damage assessment system. Additionally or alternatively the pricing information may be stored in remotely located databases and/or through pricing information from vendors found on the Internet. The analysis of the inspection data generated by the sensing devices and the pricing information cross-referenced from this analysis may form the basis for any settlement of a claim for the damage to the object.

As mentioned earlier, the damage report file may include a cost estimate for replacing/repairing the damaged object, a list of vendors that will repair/replace the damage object, the contact information (phone number, address, etc.) and the hours of availability for those vendors, and information identifying a payment or wire transfer that serves as compensation for the damage that occurred to the object. The damage report generation instructions may generate the list of vendors and associated information by accessing information stored in internal/remote databases (e.g., accessing the web pages of the vendors). To determine the vendors that are most convenient for a particular individual, the inspection data may include global positioning system (GPS) data, and the damage report generation instructions may map the closest distance of various vendors with the home/work address of the individual or the location of the damaged object.

As also noted above, the damage report file may be transmitted to the individual associated with the damaged object. In some embodiments, the mobile inspection facility may include an interface at which the individual may access the damage report file. In other embodiments, the individual may receive the through an electronic device (e.g., laptop, mobile phone, personal digital assistant (PDA), etc.). After the individual receives the damage report file, the individual may use the information for replacing and/or repairing the damaged object. In particular, if the damage to the object is greater than a predetermined threshold, the individual may use the information in the damage report file to find a replacement for the object (e.g., a new car, etc.). In other embodiments, the payment associated with damage report file may be transmitted directly to one of the approved vendors associated with replacing/repairing the damaged object. The individual may then take the damaged object to the vendor to have the object repaired and/or replaced. In yet other embodiments, several different vendors may bid to repair or replace the damaged object. In this instance, the mobile inspection facility and/or the damage assessment system may transmit data related to the damage (e.g., photos, other inspection data, etc.) to allow the vendors to generate a price quote. Once the bids are received from all the vendors, the mobile inspection facility and/or the damage assessment system may select the best (e.g., based on factors such as quality, location, and price) bid for repairing/replacing the damaged object.

If there are any unresolved issues in the damage report file and/or if the individual has any unanswered questions, the individual may be referred to a personal adjuster. In other cases, a personal adjuster may receive the case if the damage to the object is beyond a predetermined threshold.

In some embodiments, vendors/claimants may transmit feedback to the damage assessment system so that the damage assessment system may determine the accuracy of the repair/replace estimate as determined for the damage report file. In this case, the repair estimation instructions may be updated as needed to create more accurate estimates. For instance, if the repair estimate instructions repeatedly predict that the cost to repair a certain type of damage to a car door is $200 above what is being charged by vendors, the repair estimation instructions may be updated (e.g., the estimation algorithms may be updated) to reduce repair estimate generated when the sensing devices detect this type of damage in the future. Further yet, if the repair estimate instructions predict that damage to a vehicle is so severe that the vehicle needs to be replaced, and the feedback indicates that repair shops are instead able to fix the damage for less than the replacement cost, the repair estimate instructions may also be similarly updated to associate that type and extent of damage with a repair cost based on the feedback received.

Figure 6:
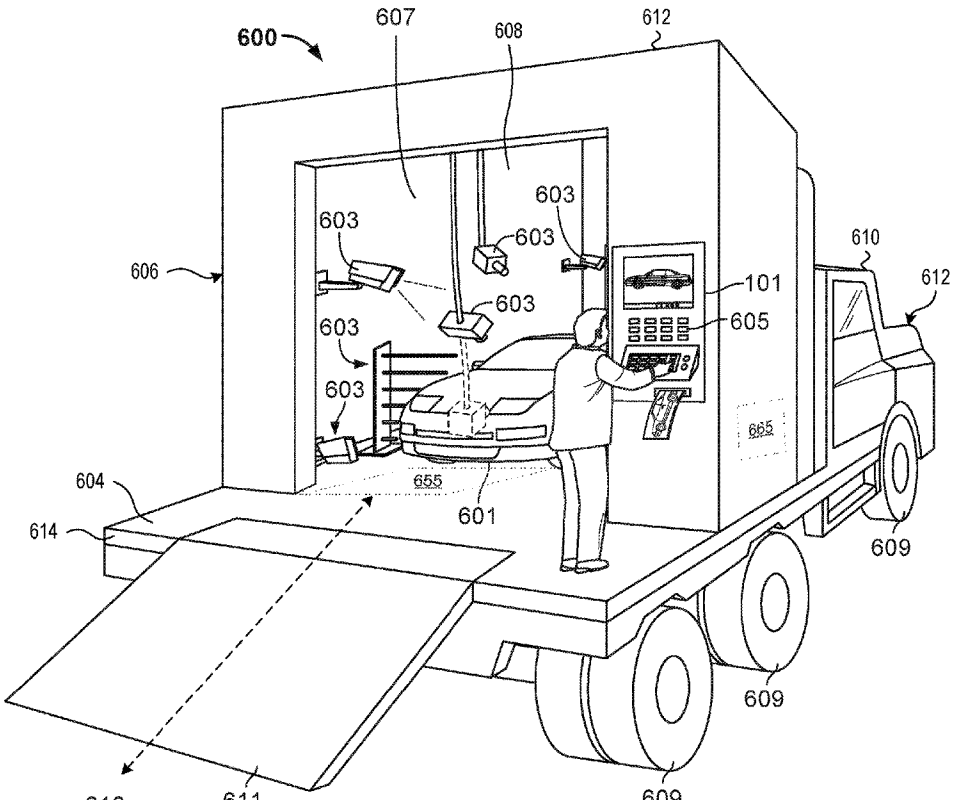
FIG. 6 illustrates a first example of an implementation of a facility for inspecting a damaged object in accordance with aspects described herein.

FIG. 6 illustrates a first example of an implementation of a mobile inspection facility 600 (e.g., an inspection facility on wheels) employing in accordance with various aspects of the present disclosure. In particular, the mobile inspection facility 600 in FIG. 6 illustrates the configuration and operation of the mobile inspection facility when the damaged object is a vehicle 601. The mobile inspection facility 600, in this example, includes a vehicle 602 and thus may be capable of moving to the site of an accident or catastrophe (e.g., via wheels 609) to assess damage to vehicle 601. In one example, the mobile inspection facility 600 may move to an accident or catastrophe site after receiving a notification at a dispatch center. In some aspects, the dispatch center may issue an alert or some other alarm indicating that the mobile inspection facility 600 should be moved to an accident or catastrophe site after receipt of the notification.

In some aspects, the vehicle 602 may be a flatbed truck having a platform 604 on which a housing 606 rests behind a cab 610 (i.e., driver's compartment) of the vehicle 602. The housing 606, in this example, includes an opening 608 that is sized and shaped so as to permit passage of a vehicle into the housing. In some example embodiments, the width of the opening 608 may be based on the width of a traffic lane so as to ensure the vehicle to be inspected may be received within the housing 606 through the opening 608. In some example embodiments, for example, the width of the opening may be between 8 feet and 15 feet. The height of the opening 608 may be based on a maximum height of the vehicles that are expected to be inspected using the mobile inspection facility 600 also to ensure the vehicle to be inspected may be received within the housing 606 through the opening 608. In some example embodiments, for example, the height of the opening may be between 6 feet and 10 feet. The length of the housing 606 may similarly be based on a maximum length of the vehicles that are expected to be inspected using the mobile inspection facility 600 so as to ensure the vehicle may be received within the housing and positioned at an inspection area 607. In some example embodiments, for example, the length of the housing 606 may be such that a vehicle having a length up to 25 feet in length may be received within the housing and positioned at the inspection area 607. Other dimensions for the housing and its opening may be employed, for example, based on the average and/or maximum vehicle dimensions in the region where the mobile inspection facility 600 is employed. These additional and alternative dimensions are thus contemplated in the present disclosure.

Once the mobile inspection facility 600 reaches an accident site, the vehicle 601 to be inspected may be driven, hoisted, pushed, or pulled through the opening 608, into the housing 606, and positioned at the inspection area 607. In particular, the mobile inspection facility 600 may include a ramp 611 that extends between a rear edge 614 of the platform 604 and a ground level 616 thus allowing the vehicle 601 to move from the ground level to the inspection area 607 within the housing 606. In other aspects, the mobile inspection facility 600 may allow for a crane to lift the vehicle 601 from a first level into the inspection area 607. In this embodiment, a roof 612 of the housing 606 may retract so the crane can lower the vehicle 601 into the housing 606 and position the vehicle at the inspection area 607. This embodiment of the mobile inspection facility may be especially useful when the vehicle 601 that is disabled. Further still, the housing 606 may be lowered or raised (e.g., hydraulically) move to the level on which vehicle 601 rests.

Once inside the housing 606, the sensing devices 603 may be aimed at the inspection area 607 to generate inspection data for the vehicle 601. Although the sensing devices 603 are shown as located inside the housing 606, some of the sensing devices 603 may be located elsewhere to facilitate the inspection of the vehicle 601. In addition, a user may operate the user interface 605 to view/print photos, data, and other information generated during the inspection. During this process, the mobile inspection facility may drive the vehicle 601 to a destination of choice, including a repair facility, the owner's home, the junkyard, etc. In some aspects, the mobile inspection facility 600 may alert the driver of the mobile inspection facility that it is ready to be moved to an alternative location.

Figure 7A:
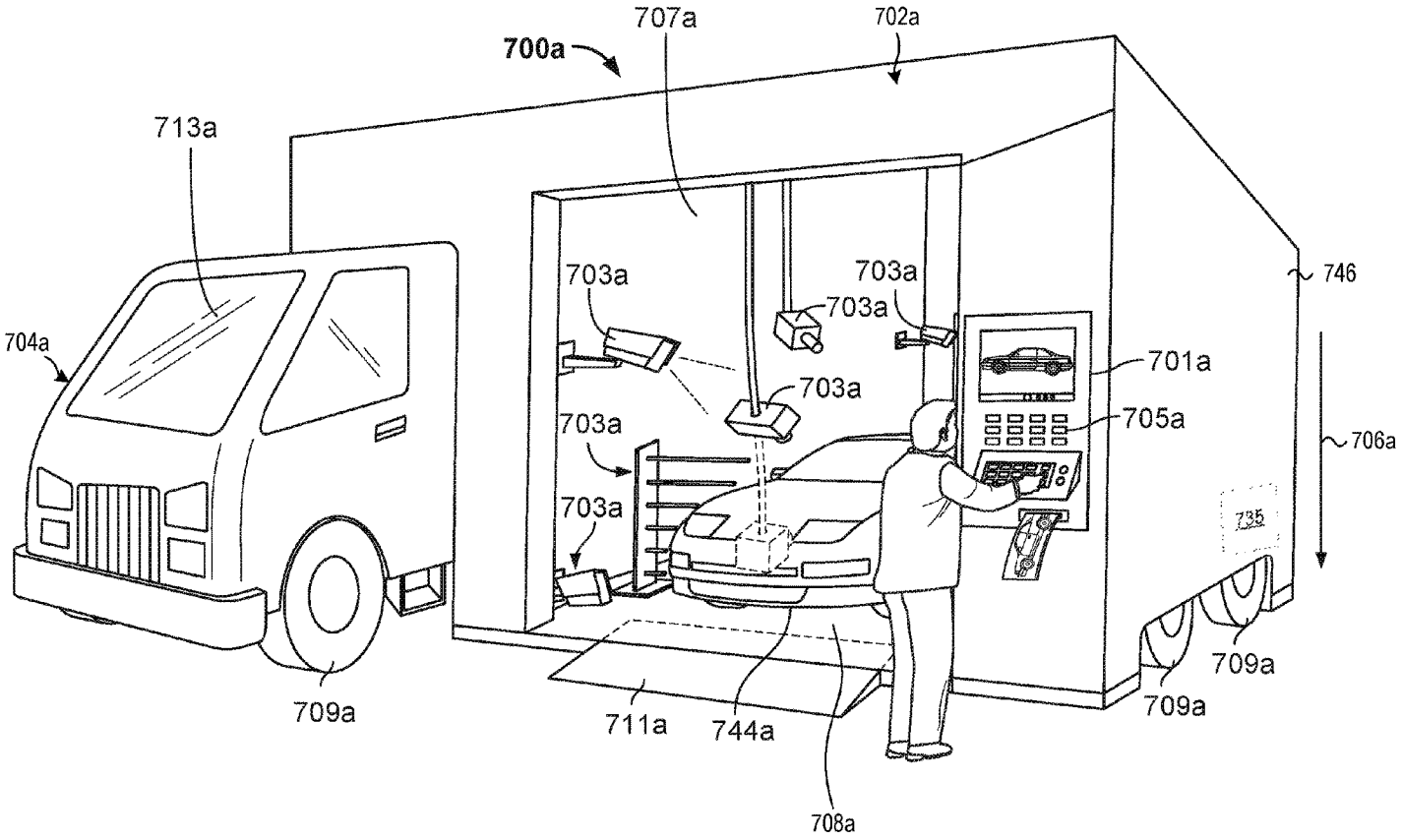
FIG. 7A illustrates an example of an implementation of a mobile inspection facility for inspecting a damaged object in accordance with aspects described herein.

FIG. 7A illustrates a second example of a mobile inspection facility 700a. The mobile inspection facility 700a, in this example, includes a damage assessment system 701a (which may be the same as or at least similar to the damage assessment systems 101 and 302 discussed above), a housing 702a, and an inspection area 707a within the housing. The mobile inspection facility 700a, in this example, is motorized to allow for movement (e.g., via wheels 709a) from one location to another. The mobile inspection facility 700a includes a vehicle 704a to which the housing 702a is mounted, and a driver may sit in the compartment 713a of the vehicle 704a to drive the mobile inspection facility to, e.g., the location of an accident. The vehicle 704a thus provides the engine for motorized transport of the mobile inspection facility 700a. The housing 702a of the mobile inspection facility 700a, in this example, is mounted to a lateral side of the vehicle 704a, e.g., the left lateral side. The housing 702a of the mobile inspection facility thus includes wheels 709a proximate to an outer lateral wall 746 to support the housing when traveling between locations. As seen in FIG. 7A, the wheels 709a proximate to the outer lateral wall 746, in this example, are positioned substantially underneath the outer lateral wall.

Once the mobile inspection facility 700a arrives, e.g., at an accident site, the vehicle 744a may move or be moved into the inspection area 707a of the housing 702a. In this example, the mobile inspection facility 700a is configured to raise and lower the housing 702a in order to permit entry of the vehicle 744a into the housing and exit of the vehicle from the housing. Accordingly the mobile inspection facility 700a may include a mechanical elevation system 735 to move the housing 702a between a raised position and a lowered position at which a vehicle may enter and exit the housing. In FIG. 7A, the housing 702a is shown to be in its lowered position as indicated by arrow 706a. The housing 702a of the mobile inspection facility 700a, in this example, also includes an extendable and retractable ramp 711a to assist entry and exit of the vehicle 744a. When the housing 702a is at the lowered position, the ramp 711a may extend outward from its retracted position to an extended position in order to provide a relatively smooth pathway from a first level (e.g., ground) to a second level of the housing 702a, e.g., the floor 708a of inspection area 707a. After the vehicle 744a has exited the housing 702a of the mobile inspection facility 700a, the ramp 711a may retract from its extended position to its retracted position. In some example implementations, the ramp may be positioned within a cavity formed by the housing when in the retracted position.

When the vehicle 744a is in a drivable state, a driver may drive the vehicle into the housing 702a of the mobile inspection facility 700a in order to position the vehicle at the inspection area 707a. When the inspection is complete, the driver may then drive the vehicle out of the housing. In some example implementations, a housing of a mobile inspection facility may include two openings disposed opposite each other, e.g., an entry way and an exit way, that allows a driver to drive a vehicle in a first direction (e.g., forward) through the first opening. position the vehicle at the inspection area, and then continue driving the vehicle in that same direction (e.g., forward) to exit the housing through the second opening. In other example implementations, a housing of an mobile inspection facility may include only one opening such that the vehicle enters the housing through the opening going in a first direction (e.g., forward) and exits the housing through that opening going in a second direction (e.g., backward). In some example implementations, the sensors positioned within the housing may be arranged such that the vehicle must be facing a particular direction in order to perform the analysis, e.g., facing the same direction as the vehicle of the mobile inspection facility. In other example implementations, the sensors may be arranged such that the inspection may be performed regardless of the direction the vehicle is facing during the inspection. For example, the set of sensors arranged on the right side of the housing may match the set of sensors arranged on the left side of the housing in order to fully inspect the vehicle regardless of the direction the vehicle faces.

A mobile inspection facility may also include one or more devices 655 and 665 to assist bringing a vehicle into the housing and positioning the vehicle at the inspection area when the vehicle is in an undriveable state. Such mechanisms 655 and 665 may include a winch, hoist, or conveyor each configured to move the vehicle from its resting position into the housing. The winch, for example, may use a hook and cable to tow the vehicle into the housing. The winch may be a hand-powered winch (e.g., having a hand crank), may be powered by the vehicle of the mobile inspection facility, or have its own independent power source. The hoist may lift the vehicle from its resting position, carry it into the housing, and deposit the vehicle at the inspection area. The conveyor 655 may, in some implementations, include a motorized conveyor belt positioned on or within the floor of the housing operate by "catching" the wheels of the vehicle (e.g., when the vehicle is pushed to the edge of the conveyor) and transporting the vehicle to the inspection area within the housing. The conveyor 655 may alternatively include a series of lineshaft rollers positioned on or within the floor of the housing that facilitate pushing the vehicle into the housing. In some example implementations, the lineshaft rollers may freely rotate about a central shaft. In other example implementations, the lineshaft rollers may be rotationally driven to provide further assistance in bringing the vehicle into the housing. The sensors positioned within the housing may include sensors that indicate when the vehicle is correctly positioned at the inspection area. The devices discussed above may likewise facilitate moving the vehicle out of the housing once the inspection is complete. The direction of the conveyer 655, for example, may be reversed to transport the vehicle out of the housing. Additional examples will be appreciated with the benefit of this disclosure.

As seen in FIG. 7A, once inside inspection area 707a, the sensors 703a may perform an inspection of the vehicle 744a and damage assessment system 701a may then analyze the sensor data generated during the inspection and assess whether any damage has occurred to the vehicle 744a as well as the type and extent of that damage. In addition, a user may operate user interface 705a to view/print photos, data, and other information about the damage associated with vehicle 744a.

Figure 7B:
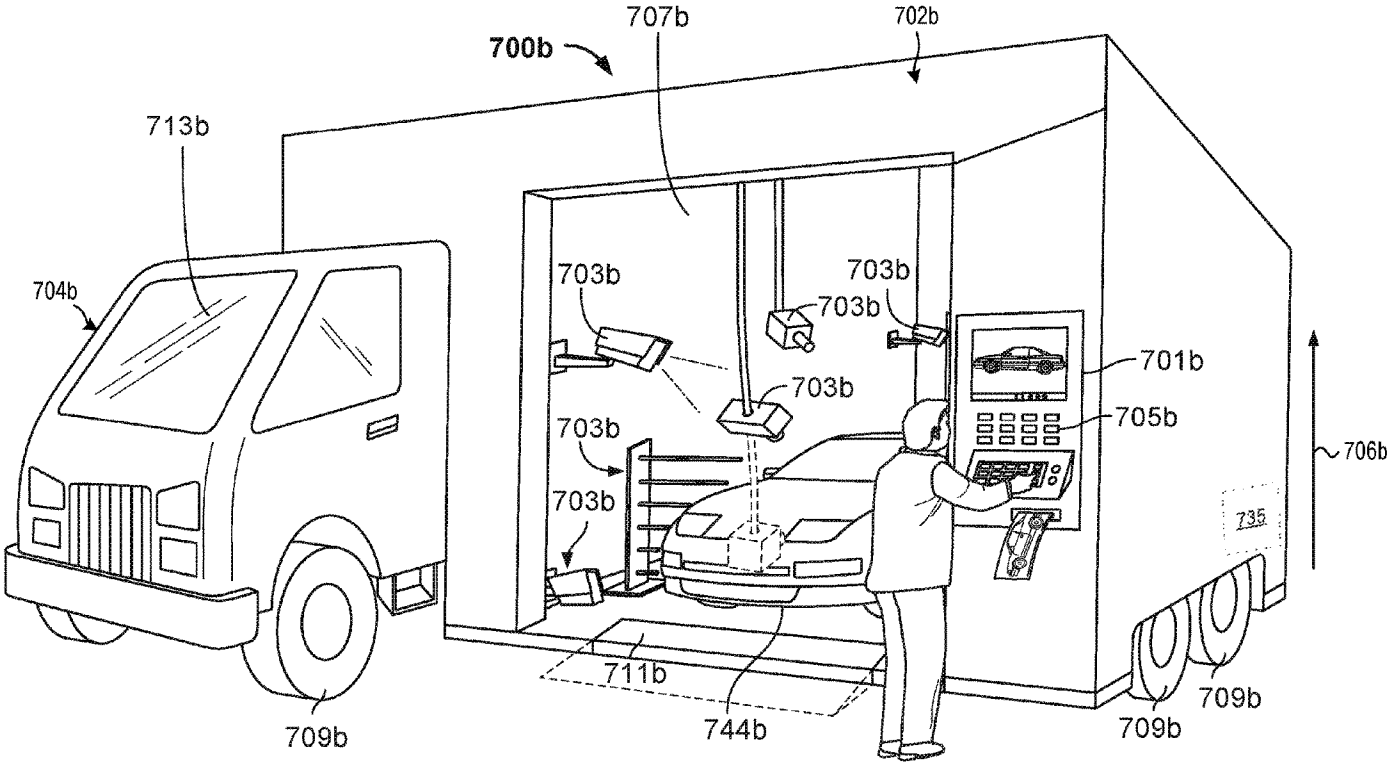
FIG. 7B illustrates the example of the implementation of the mobile inspection facility for inspecting a damaged object of FIG. 7A in one example position.

FIG. 7B illustrates a second example of a mobile inspection facility 700b with a damage assessment system 701b, a vehicle 704b, and a housing 702b mounted to the vehicle and having an inspection area 707b in accordance with various aspects of the present disclosure. In FIG. 7B, the mobile inspection facility 700b is shown with the housing 702b in the raised position as indicated by arrow 706b. By raising the housing 702b to the raised position, the mobile inspection facility may be 700b to be moved (e.g., via wheels 709b) from one location to another. As seen in FIG. 7B, the housing 702b, in this example, may be raised with the vehicle 744b positioned inside. In this way, a driver sitting in the compartment 713b of the vehicle 704b may drive the mobile inspection facility 700b to another location (e.g., to a car repair shop). As described above-ramp 711b in FIG. 7B has been retracted to allow the mobile inspection facility 700b to be driven between locations. The mobile inspection facility 700b may thus perform the inspection of the vehicle 744b while moving between locations.

To allow for real-time communication with third parties (e.g., repair facilities, law enforcement personnel, etc.), the damage assessment system 701b and/or the mobile inspection facility itself may be equipped with one or more communication device (e.g., modem 127, wireless device, satellite dishes, etc.).

Figure 8A:
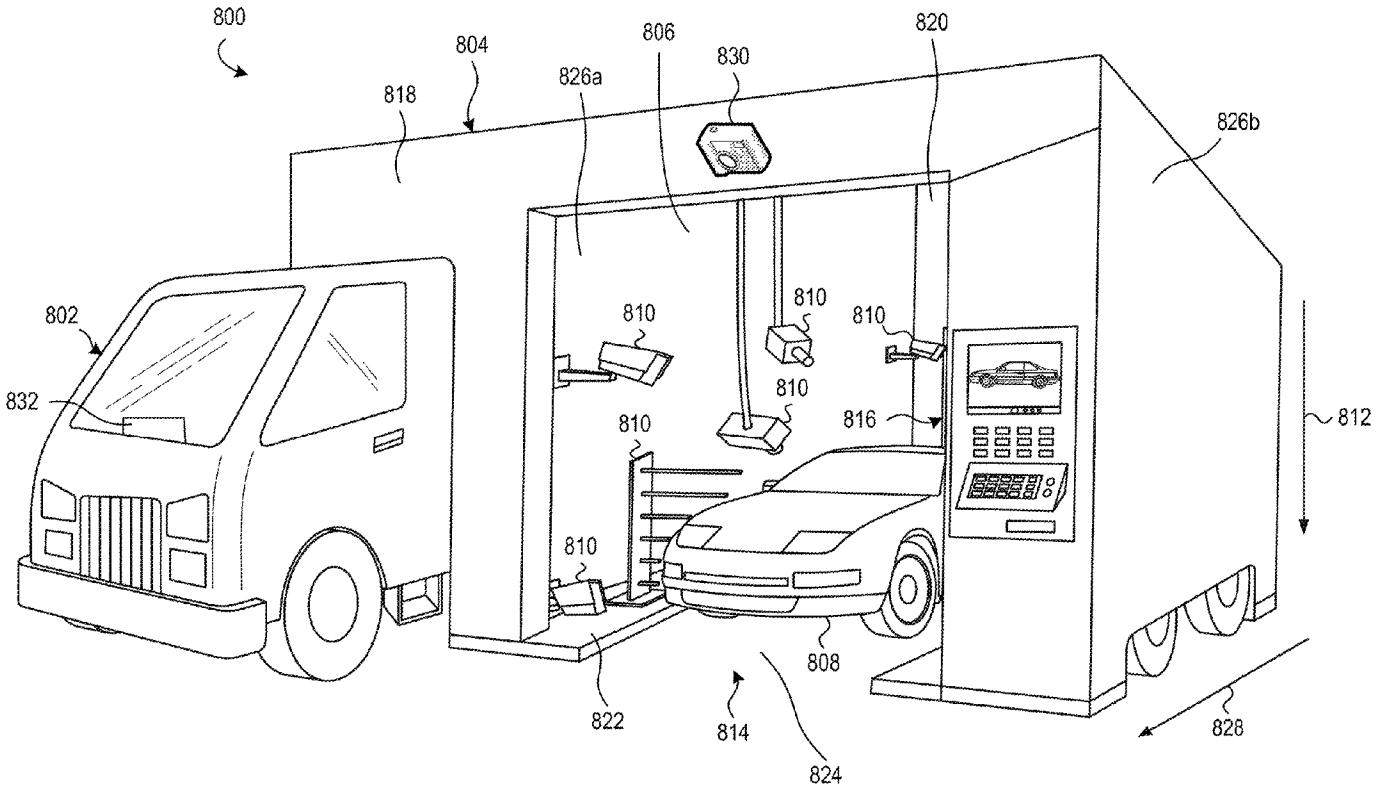
FIG. 8A illustrates a second example of an implementation of a mobile inspection facility for inspecting a damaged object in accordance with aspects described herein.
Figure 8B:
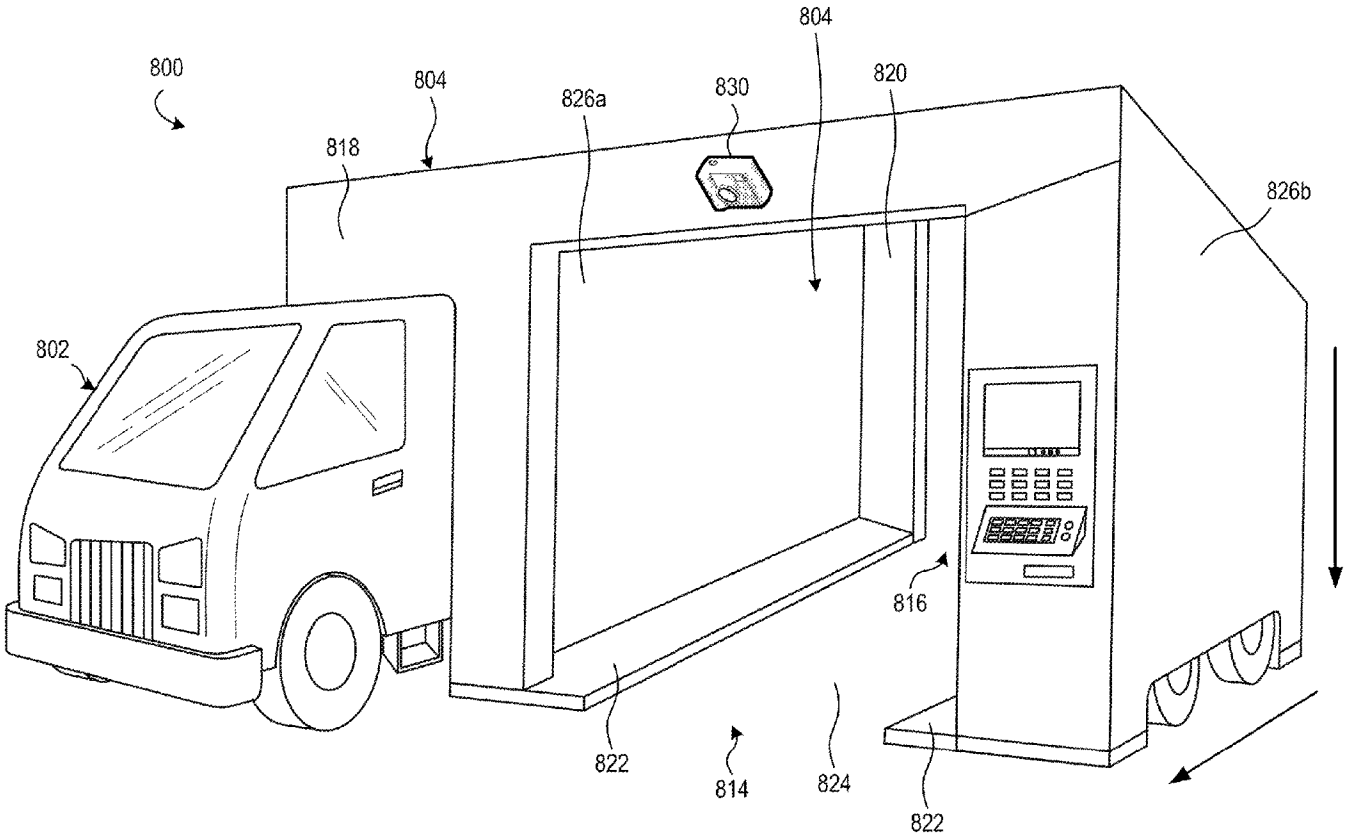
FIG. 8B also illustrates another view of the second example of the implementation of the mobile inspection facility of FIG. 8A.

Referring now to FIGS. 8A and 8B, an additional implementation of a mobile inspection facility 800 is shown. Like the mobile inspection facility discussed above with reference to FIGS. 7A-B, the mobile inspection facility includes a vehicle 802, a housing 804 mounted to the vehicle, and an inspection area 806 positioned within the housing at which a vehicle 808 can be inspected using various sensors 810 positioned throughout the interior of the housing and aimed at the inspection area. Like the housing described above with reference to FIGS. 7A-B, the housing 804, in this example, is configured to move between a raised up position and a lowered position as indicated by the arrow 812. The vehicle 802 may include controls for raising and lowering the housing 804. The housing 804 may be moved to its raised up position prior to driving the mobile inspection facility 800 to a new location. The housing 804 may then be lowered until a bottom surface of the housing rests on or close to the ground. The housing 804 also includes openings 814 and 816 size and shaped to permit passage of the vehicle 808 into the housing. The housing 804, in this example, includes a front opening 814 formed in a front side wall 818 of the housing as well as a rear opening 816 formed in a rear side wall 820 of the housing and positioned opposite the front opening. As seen in FIG. 8A, the front side wall 818 and the rear side wall 820 are both substantially perpendicular to the direction of travel of the vehicle 802. The lower surface 822 of the housing 804, in this example, forms a passageway 824 that extends between the front opening 814 and the rear opening 816 of the housing. The passageway 824 is also sized and shaped to permit passage of the vehicle 808 into and through the housing 804 as well as through the openings 814 and 816. The passageway 824 may thus have a width between about 8 feet to about 15 feet. As seen in FIG. 8, the sensors 810 may be arranged within the housing 804 on either side of the passageway 824 next to the side walls 826 of the housing.

As seen in FIG. 8A and indicated by the arrow 828, the mobile inspection facility 800 may be driven past the vehicle 808 in order to receive through one of the openings 814 or 816. The mobile inspection facility 800 may position the housing 804 such that one of the openings 814 or 816 is lined up with the vehicle 808 and then drive past the vehicle in order to position the vehicle at the inspection area. The housing 804 may include one or more sensors to assist the driver of the vehicle 802 in lining up the openings 814 or 816 of the housing 804 with the vehicle 808. The sensors may include, for example, proximity sensors positioned around the perimeter of the opening that indicate how close the vehicle is to the edge of the opening and activate an alarm if the vehicles comes within a predetermined distance of that edge. The sensors may also include a camera that provides a real-time video feed of the exterior area adjacent to any openings of the housing, e.g., the area in front of or behind the housing. The housing 804, in this example, includes a camera 830 mounted to the front side wall 818 above the front opening 814 that images the area in front of the front opening 814. The camera 830 may provide a real-time video feed to a display device 832 located in the vehicle 802 which a driver may view when positioning the housing 804 behind the vehicle. The video presented at the display device 832 may include an overlay image depicting the edges of the opening 814 in order to indicate the position of the vehicle to be received within the housing 804 relative to the edges of the opening. As discussed further below, instructions and other indicators may accompany the video feed to assist the driver in aligning the opening of the housing with the vehicle. The housing 804 may also include a camera mounted to the rear side wall 820 above the rear opening 816 and likewise image the area behind the rear opening 816. In this way the housing 804 may be positioned either behind or in front of the vehicle 808 and respectively driven either forward or backward to receive the vehicle within the housing. The configuration of the openings 814 and 816 and the passageway 824 between them may be useful when there is a need tp inspect vehicles that cannot enter the housing under their own power. The housing 804 may instead be aligned with the vehicle and driven forward/backward in order to receive the vehicle through one of the openings 814 or 816. In some example implementations, a mobile inspection facility may include only a front opening and a passageway extending from the front opening into the housing.

Referring now to FIG. 8B, the mobile inspection facility 800 is shown without the sensors 810 or the vehicle 808 in order to better illustrate the configuration of the housing 804. As seen in FIG. 8B, the housing 804 forms an interior chamber 834 bounded by a front side wall 818, a rear side wall 820, and two lateral side walls 826a-b. As seen in FIG. 8B, the lateral side wall 826a is positioned adjacent to the lateral side of the vehicle 802, and the lateral side wall 826b is disposed opposite the lateral side of the vehicle and the lateral side wall 826a. As described above, the front side wall 818 forms a front opening 814 that is sized and shaped to allow passage of a vehicle, and the rear side wall 820 likewise forms a rear opening 816 that is also sized and shaped to allow passage of a vehicle. As also described above, the lower surface 822 of the housing forms a passageway 824 that extends between the front opening 814 and the rear opening 816. The passageway 824 may likewise have a width that allows passage of a vehicle.

Figure 9:
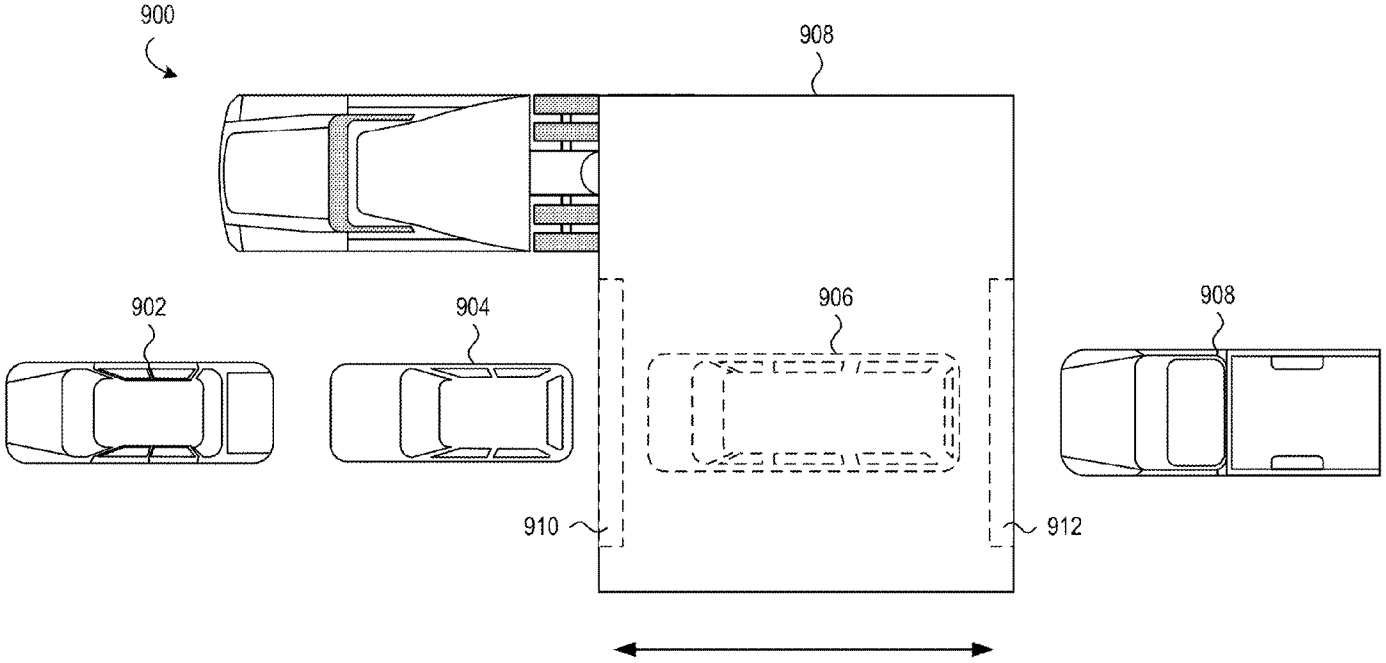
FIG. 9 illustrates a top-down view an example of an implementation of a mobile inspection facility for inspecting a damaged object in accordance with aspects described herein.

FIG. 9 illustrates an example scenario in which a mobile inspection facility may be utilized to inspect multiple vehicles 902-908. As seen in FIG. 9, the vehicles 902-908 have been lined up behind each other to allow the mobile inspection facility 900 to inspect each vehicle in sequence. By lining up the vehicles, the mobile inspection facility 900 may position its housing 908 at the end of the line of vehicles 902-908 with openings 910 and 912 of the housing aligned with those vehicles. Then, as seen in FIG. 9, the mobile inspection facility may drive the housing down the line of vehicles 902-908 stopping at each vehicle to perform an inspection. Additionally or alternatively, the mobile inspection facility 900 may be driven to and parked at a location and, rather than drive the mobile inspection facility down a line of vehicles, the vehicles themselves may drive through the housing for inspection.

Figure 10B:
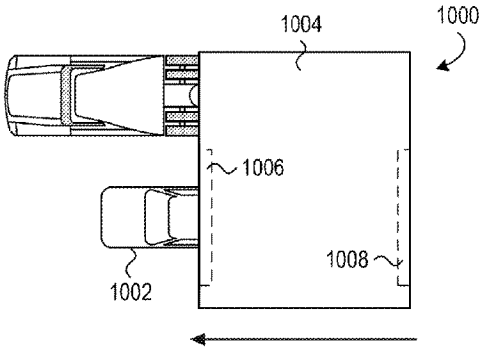
FIGS. 10A-D illustrate an example sequence of operations of an example of an implementation of a mobile inspection facility for inspecting a damaged object in accordance with aspects described herein.
Figure 10D:
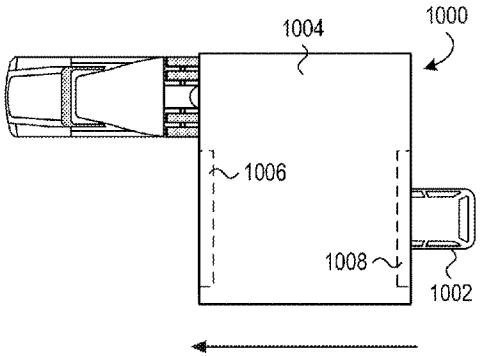
Figure 10A:
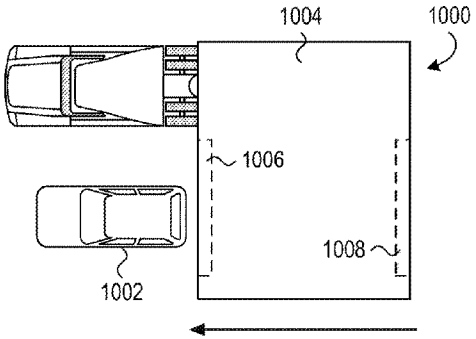
Figure 10C:
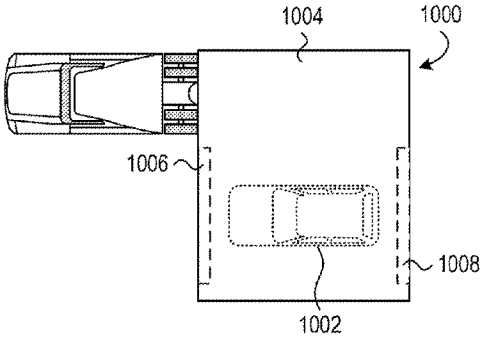

FIGS. 10A-D illustrate the sequence of movements a mobile inspection facility 1000 may perform to receive a vehicle 1002 within its housing 1004. As seen in FIG. 10A, the mobile inspection facility 1000 may align the front opening 1006 of the housing 1004 with the vehicle 1002. Then, as seen in FIG. 10B, the mobile inspection facility 1000 may then drive forward to receive the vehicle 1002 through the front opening 1006 and into the housing 1004. Once the vehicle 1002 has been received within the housing 1004 and positioned at the inspection area 1010, as seen in FIG. 10C, the mobile inspection facility may perform the inspection of the vehicle as described above. After the inspection is complete, the mobile inspection facility 1000 may continue driving forward, as seen in FIG. 10D, such that the vehicle 1002 exits the housing 1004 through its rear opening 1008. As described above, the mobile inspection facility 1000 may also perform the same movements in reverse such that the housing 1004 is driven backwards to receive the vehicle 1002 through the rear opening 1008 and such that the vehicle exits the housing through the front opening 1006 when the inspection is complete. As noted above, the housing of a mobile inspection facility may also only include a front opening or a rear opening. In these example implementations, the housing may be driven forward and backward such that the vehicle enters and exits the housing through the same opening, e.g., a front opening or a rear opening.

Figure 11:
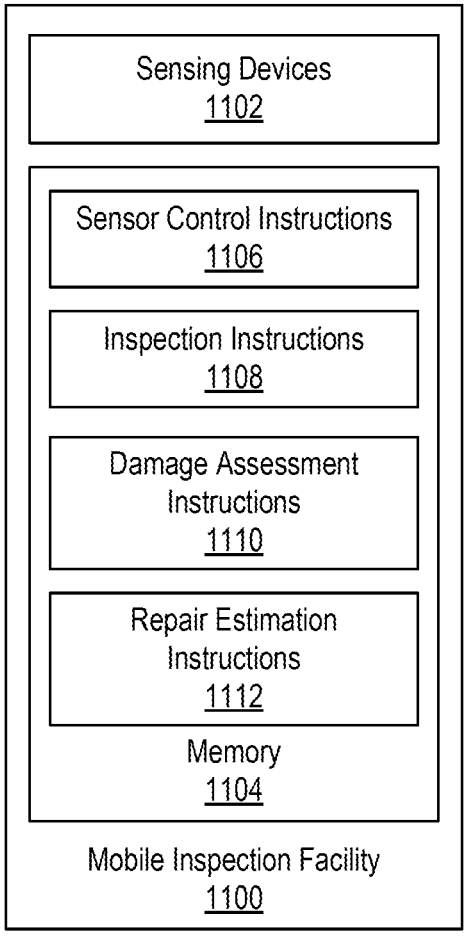
FIG. 11 illustrates another example of an implementation of a mobile inspection facility for inspecting a damaged object in accordance with aspects described herein.

FIG. 11 illustrates another example of an implementation of a mobile inspection facility 1100. The mobile inspection facility 1100, in this example, includes both the sensing devices 1102 used to perform the inspection of an object as well as the instructions for analyzing the inspection data generated by the sensing devices and collected during the inspection. The mobile inspection facility 1100, in this example, thus includes memory 1104 storing instruction sets that, when executed, carry out the inspection and analyze the inspection data obtained. The instructions sets may be similar to the instruction sets discussed above with reference to FIG. 3. The memory 1104 of the mobile inspection facility 1100, in this example, thus includes sensor control instructions 1106 configure to control one or more of the sensing devices 1102 during the inspection either automatically or in response to user input, inspection instructions 1108 configured to invoke the sensor control instructions during an inspection to activate one or more of the sensing devices and control the sequence of the inspection, damage assessment instructions 1110 that analyze the inspection data obtained in order to assess the damage that has occurred to the object, and repair estimation instructions 1112 configured to estimate a cost to repair or replace the object based on the damage assessment.

Figure 12A:
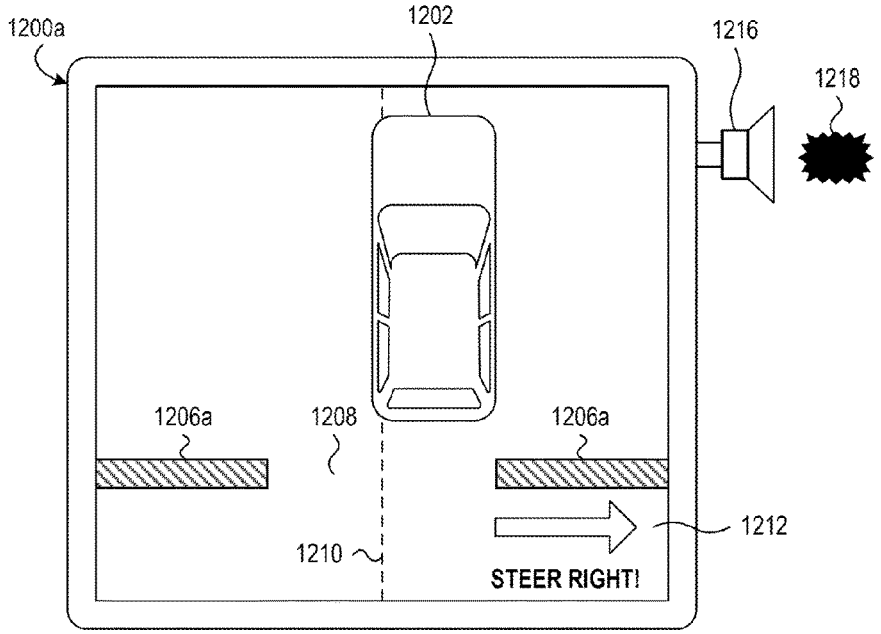
FIGS. 12A-B illustrate an example of an implementation of an interface configured to assist receiving an object to be inspected within a housing of a mobile inspection facility.
Figure 12B:
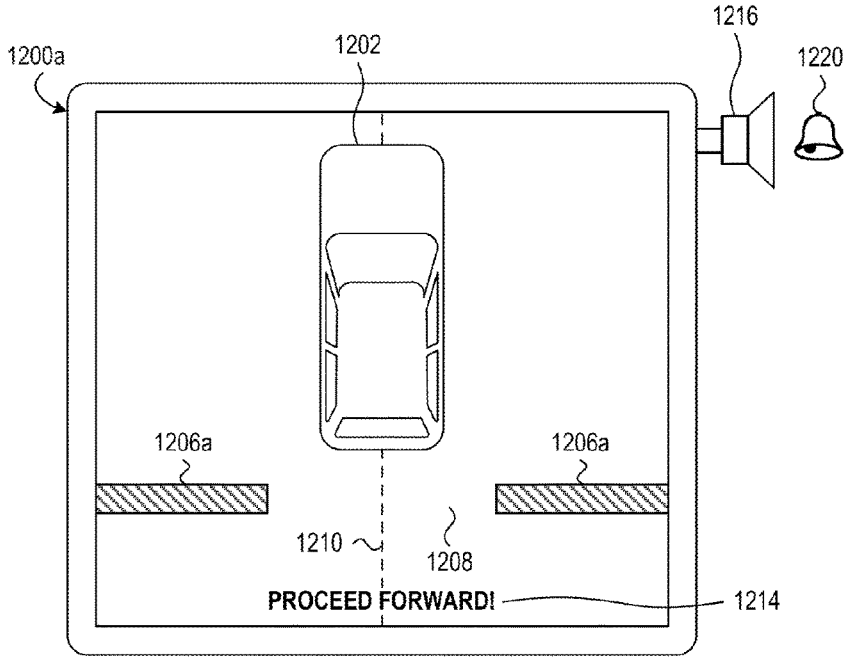

Referring now to FIGS. 12A-B, two example interfaces 1200a and 1200b configured to assist receiving an object 1202 to be inspected within a housing of a mobile inspection facility are shown. In this example, the object 1202 to be inspected is a vehicle. The interfaces 1202a-b may be presented at a display device 1204 (e.g., a video screen). The interfaces 1200a-b, in this example, present a video feed of the area in front of (or behind) an opening of the housing of the mobile inspection facility. A driver may thus monitor the video feed when maneuvering the mobile inspection facility to receive the vehicle 1202 within its housing.

The interface 1200a-b also present various image overlays on the video feed to further assist the driver in maneuvering the mobile inspection facility. As seen in FIGS. 12A-B, for example, the interfaces 1200a-b present overlays 1206a and 1206b that represent the wall of the housing an indicate the position of the vehicle 1202 relative to the edges of the opening 1208. In this way, the driver can determine whether the housing should be steered right or left in order to align the opening 1208 with the vehicle 1202. The interfaces 1200a-b also present an overlay image 1210 corresponding to the midline of the opening which the driver may likewise use to align the opening 1208 with the vehicle 1202. The interfaces 1200a-b, in this example, are also configured to present instructions indicating whether the vehicle is aligned or offset relative to the opening 1208. As seen in FIG. 12A, for example, the vehicle 1202 is offset to the right of the opening 1208. An instruction 1212 presented on the interface 1200a thus indicates the driver should steer to the right in order to better align the vehicle 1202 with the opening 1208. An audio output device 1216 that outputs a warning tone 1218 when the vehicle 1202 is not aligned with the opening 1208. In FIG. 12B, the vehicle 1202 is aligned with the opening 1208 as indicated by the midline overlay image 1210. Accordingly the interface 1200b presents an instruction 1214 indicating it is safe to drive the mobile inspection facility forward to receive the vehicle 1202 within its housing. The audio output device 1216 may output a confirmation tone 1220 when the vehicle 1202 is aligned with the opening 1208. The mobile inspection facility may include, e.g., proximity sensors positioned near the opening of the housing that provide the signals used to determine the position of the vehicle relative to the opening. Additional features of the interfaces 1200a-b will be appreciated with the benefit of this disclosure.

Figure 13:
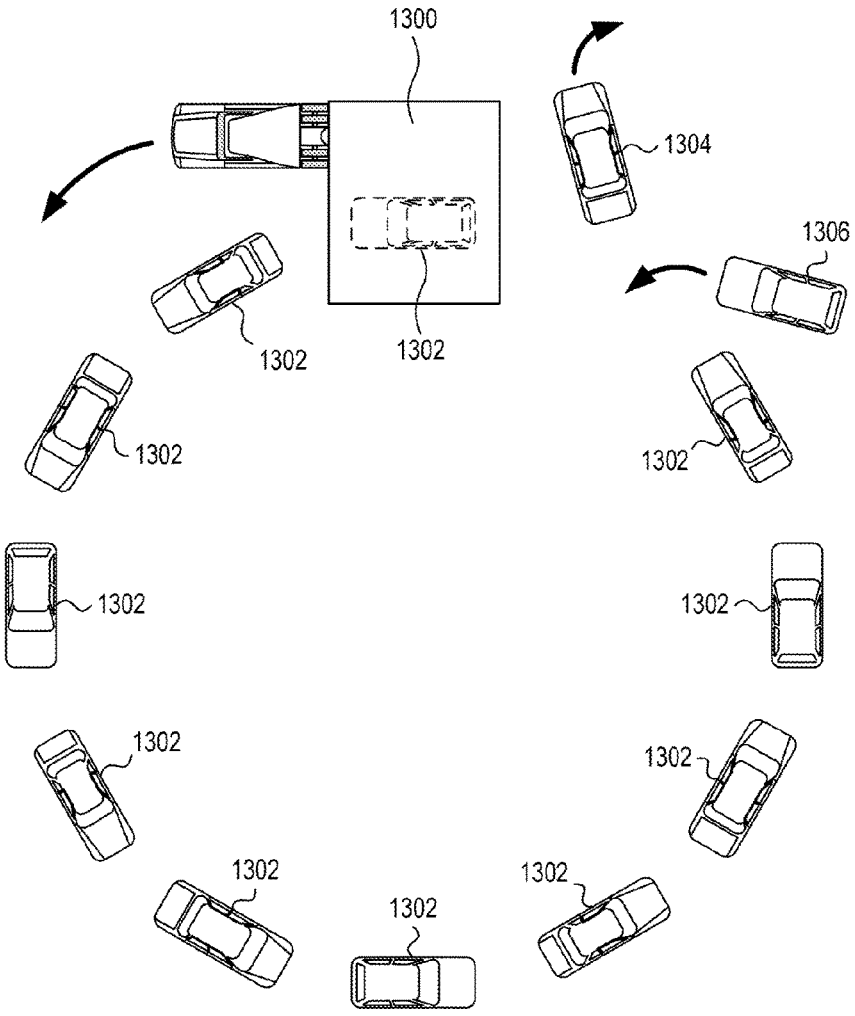
FIG. 13 illustrates an example use case for using a mobile inspection facility to inspect multiple objects residing at a location.

FIG. 13 illustrates an example use case for using the mobile inspection facility 1300 to inspect multiple objects residing at a location. In FIG. 13, the objects under inspection are again vehicles 1302. The vehicles 1302, in this example, have been arranged along a circular path that the mobile inspection facility 1300 may follow to sequentially inspect the vehicles 1302 in a continuous fashion. In addition, once a vehicle 1304 has been inspected, that vehicle may leave the line to create a space for a new vehicle 1306 that takes its place in line. The mobile inspection facility 1300 may thus inspect that new vehicle 1306 upon returning to that point in the path. Other vehicles may similarly exit and enter the line of vehicles as the mobile inspection facility 1300 completes its inspections of vehicles. This arrangement thus provides an efficient process for inspecting multiple vehicles residing at the same location. Although the vehicles 1302 are shown to be arranged along a circular pathway in FIG. 13, any type of pathway that permits continuous inspection of the vehicles may be selectively employed by iteratively traversing that pathway may be selectively employed.

One of ordinary skill in the art would recognize that the methods and systems discussed herein may be applied to all forms of insurance (e.g., home, auto, etc.) and financial services. For instance, the methods/systems of this disclosure (e.g., enhanced claims settlement server 101, handheld devices, etc.) may be used to process a homeowner's claim (e.g., for an insured home).

Aspects of the invention have been described in terms of illustrative embodiments thereof. Numerous other embodiments, modifications and variations will occur to persons of ordinary skill in the art from a review of this disclosure. For example, one of ordinary skill in the art will appreciate that the steps discussed herein may be performed in other than the recited order, and that one or more steps may be optional in accordance with aspects of the invention.

What is claimed is:

1. An apparatus comprising:

a vehicle;

a housing mounted to a lateral side of the vehicle, the housing [comprising] *being sized and shaped to house a damaged vehicle, wherein the housing comprises* an interior chamber [and], an area within the interior chamber at which [an object] *the damaged vehicle* is positionable, *an opening sized and shaped to permit passage of the damaged vehicle into and out of the interior chamber, and one or more wheels proximate to an outer lateral wall of the housing, and* wherein the housing, while mounted to the vehicle, is positionable between a raised position and a lowered position; and a plurality of sensing devices positioned within the interior chamber of the housing and aimed at the area, each one of the plurality of sensing devices being configured to generate sensor data corresponding to the [object] *damaged vehicle*.

[2. The apparatus of claim 1, wherein:

the object is a damaged vehicle; and the housing is sized and shaped to house the damaged vehicle.]

[3. The apparatus of claim 2, wherein:

the housing comprises an opening sized and shaped to permit passage of the damaged vehicle into and out of the interior chamber of the housing.]

4. The apparatus of claim [3] *1*, wherein:

the opening has a width between about 8 feet to about 15 feet.

5. The apparatus of claim [4] *1*, wherein:

the opening has a width of about 12 feet.

[6. The apparatus of claim 3, wherein:

the housing comprises one or more wheels proximate to an outer lateral wall of the housing.]

[7. The apparatus of claim 6, further comprising:

a mechanism configured to raise and lower the housing vertically between a first position at which the housing is relatively further from a ground level and a second position at which the housing is relatively closer to the ground level.]

8. The apparatus of claim [6] *1*, further comprising:

an imaging device configured to generate a video feed of an exterior area adjacent to the opening of the housing; and a display device positioned within the vehicle and configured to display the video feed.

9. The apparatus of claim 8, wherein:

the display device is further configured to display, on the video feed, an overlay image that depicts an edge of the opening of the housing relative to the exterior area.

10. The apparatus of claim [6] *1*, wherein:

the opening is formed in a front side wall of the housing, the front side wall being substantially perpendicular to a direction of travel of the vehicle.

11. The apparatus of claim 10, further comprising:

a second opening formed in a rear side wall of the housing disposed opposite the front side wall.

12. The apparatus of claim 11, further comprising:

a passageway formed through the interior chamber of the housing between the opening formed in the front side wall and the second opening formed in the rear side wall; and wherein the passageway is sized and shaped to permit passage of the damaged vehicle through the passageway.

13. The apparatus of claim 12, wherein:

the passageway has a width between about 8 feet to about 15 feet.

14. The apparatus of claim 13, wherein:

the passageway has a width of about 12 feet.

15. The apparatus of claim [3] *1*, further comprising:

a device configured to assist transporting the damaged vehicle into the interior chamber of the housing.

[16. The apparatus of claim 15, wherein:

the device comprises one of a winch, a conveyor belt, or a series of lineshaft rollers.]

[17. The apparatus of claim 3, further comprising:

a platform positioned behind a cab of the vehicle and supporting the housing; and a ramp connected to the platform and configured to extend between a rear edge of the platform to a ground level.]

18. The apparatus of claim 1, further comprising:

a damage assessment system configured to perform an analysis of the sensor data generated by one or more of the plurality of sensing devices and identify damage that has occurred to the [object] *damaged vehicle* based on the analysis of the sensor data.

19. The apparatus of claim 18, wherein:

the damage assessment system is further configured to estimate a cost to repair or replace the [object] *damaged vehicle* based on the damage identified.

20. The apparatus of claim 1, wherein[:] the plurality of sensing devices comprise one or more of*:*

(i) a first device configured to generate one or more images of the [object] *damaged vehicle* wherein the images comprise one or more of a two-dimensional image of the [object] *damaged vehicle*, a three-dimensional image of the [object] *damaged vehicle*, a tomographic image of the [object] *damaged vehicle*, an infrared image of the [object] *damaged vehicle*, a magnetic resonance image of the [object] *damaged vehicle*, or an X-ray of the [object] *damaged vehicle*, (ii) a second device configured to measure the [object] *damaged vehicle* using a laser, (iii) a third device configured to measure the [object] *damaged vehicle* using pressure waves, or (iv) a fourth device configured to detect a fluid associated with the [object] *damaged vehicle*.

[21. The apparatus of claim 1, further comprising:

a lift positioned at the area at which the object is positionable and configured to move the object between a raised position and a lowered position; and a robotic arm positioned within the housing and configured to grasp and reposition a portion of the object.]

22. A method comprising:

driving an apparatus to a location of a damaged vehicle, the apparatus comprising:

(i) a vehicle, (ii) a housing mounted to a lateral side of the vehicle, the housing comprising an interior chamber, an opening sized and shaped to permit passage of the damaged vehicle into the interior chamber, [and] an area within the interior chamber at which the damaged vehicle is positionable, *and a wall that forms the opening of the housing and is substantially perpendicular to a direction of travel of the vehicle,* wherein the housing, as mounted to the vehicle, is positionable between a raised position and a lowered position, and (iii) a plurality of sensing devices positioned within the interior chamber of the housing and aimed at the area, each one of the plurality of sensing devices being configured to generate sensor data corresponding to the damaged vehicle;

receiving the damaged vehicle through the opening and into the interior chamber of the housing *wherein the receiving comprises aligning the opening with the damaged vehicle and driving the apparatus in a direction that causes the damaged vehicle to pass through the opening and into the interior chamber of the housing*;

positioning the damaged vehicle at the area; and performing an inspection of the *damaged* vehicle using one or more of the plurality of sensing devices to generate sensor data corresponding to the damaged vehicle.

[23. The method of claim 22, wherein:

the housing further comprises a wall that forms the opening of the housing and is substantially perpendicular to a direction of travel of the vehicle; and receiving the damaged vehicle within the interior chamber of the housing comprises aligning the opening with the damaged vehicle and driving the apparatus in a direction that causes the vehicle to pass through the opening and into the interior chamber of the housing.]

24. An apparatus comprising:

a vehicle;

a housing mounted to the vehicle and positioned on a lateral side of the vehicle, the housing comprising:

an interior chamber sized and shaped to house a damaged vehicle, an area within the interior chamber at which the damaged vehicle is positionable, a front side wall that is substantially perpendicular to a direction of travel of the vehicle, the front side wall forming a first opening sized and shaped to permit passage of a damaged vehicle into and out of the interior chamber, a rear side wall that is substantially perpendicular to the direction of travel of the vehicle and disposed opposite to the front side wall, the rear side wall forming a second opening sized and shaped to permit passage of the damaged vehicle into and out of the interior chamber, a lower surface extending between the front side wall and the rear side wall;

a passageway formed through the lower surface and extending between the first opening and the second opening, the passageway being sized and shaped to permit passage of the damaged vehicle through the interior chamber of the housing, a lateral wall extending between the front side wall and the rear side wall and disposed opposite the lateral side of the vehicle, and one or more wheels positioned proximate to the lateral wall;

a plurality of sensing devices positioned within the interior chamber of the housing and aimed at the area, each one of the plurality of sensing devices being configured to generate sensor data corresponding to the damaged vehicle; and a damage assessment system configured to identify damage that has occurred to the damaged vehicle based on an analysis of the sensor data and estimate a cost to repair or replace the damaged vehicle based on the damage identified.

*25. An apparatus comprising:*

*a vehicle;*

*a housing adjacent to a lateral side of the vehicle, the apparatus being sized and shaped to house a damaged vehicle, wherein the apparatus comprises an interior chamber, an area within the interior chamber at which the damaged vehicle is positionable, an opening sized and shaped to permit passage of the damaged vehicle into and out of the interior chamber of the apparatus, wherein the housing comprises one or more wheels proximate to an outer lateral wall of the housing, and wherein the housing, while adjacent to the vehicle, is positionable between a raised position and a lowered position; and*

*a plurality of sensing devices positioned within the interior chamber of the apparatus and aimed at the area, each one of the plurality of sensing devices being configured to generate sensor data corresponding to the damaged vehicle.*

*26. The apparatus of claim 25, wherein: the opening has a width between about 8 feet to about 15 feet.*

*27. The apparatus of claim 26, wherein: the opening has a width of about 12 feet.*

*28. The apparatus of claim 25, further comprising: an imaging device configured to generate a video feed of an exterior area adjacent to the opening of the housing; and a display device positioned within the vehicle and configured to display the video feed.*

*29. The apparatus of claim 28, wherein: the display device is further configured to display, on the video feed, an overlay image that depicts an edge of the opening of the housing relative to the exterior area.*

*30. The apparatus of claim 25, wherein: the opening is formed in a front side wall of the apparatus, the front side wall being substantially perpendicular to a direction of travel of the vehicle.*

*31. The apparatus of claim 30, further comprising: a second opening formed in a rear side wall of the apparatus disposed opposite the front side wall.*

*32. The apparatus of claim 31, further comprising: a passageway formed through the interior chamber of the apparatus between the opening formed in the front side wall and the second opening formed in the rear side wall; and wherein the passageway is sized and shaped to permit passage of the damaged vehicle through the passageway.*

*33. The apparatus of claim 32, wherein: the passageway has a width between about 8 feet to about 15 feet.*

*34. The apparatus of claim 33, wherein: the passageway has a width of about 12 feet.*

*35. The apparatus of claim 25, further comprising: a device configured to assist transporting the damaged vehicle into the interior chamber of the apparatus.*

*36. The apparatus of claim 25, further comprising: a damage assessment system configured to perform an analysis of the sensor data generated by one or more of the plurality of sensing devices and identify damage that has occurred to the damaged vehicle based on the analysis of the sensor data.*

*37. The apparatus of claim 36, wherein: the damage assessment system is further configured to estimate a cost to repair or replace the damaged vehicle based on the damage identified.*

*38. The apparatus of claim 25, wherein the plurality of sensing devices comprise one or more of:*

*(i) a first device configured to generate one or more images of the damaged vehicle wherein the images comprise one or more of a two-dimensional image of the damaged vehicle, a three-dimensional image of the damaged vehicle, a tomographic image of the damaged vehicle, an infrared image of the damaged vehicle, a magnetic resonance image of the damaged vehicle, or an X-ray of the damaged vehicle,*

*(ii) a second device configured to measure the damaged vehicle using a laser,*

*(iii) a third device configured to measure the damaged vehicle using pressure waves, or*

*(iv) a fourth device configured to detect a fluid associated with the damaged vehicle.*

*39. A method comprising:*

*driving an apparatus to a damaged vehicle analysis location, the apparatus comprising:*

*(i) a vehicle,*

*(ii) a housing adjacent to a lateral side of the vehicle, the apparatus further comprising an interior chamber, an opening sized and shaped to permit passage of the damaged vehicle into the interior chamber, an area within the interior chamber at which the damaged vehicle is positionable, and a wall that forms the opening of the housing and is substantially perpendicular to a direction of travel of the vehicle, wherein the housing, as adjacent to the vehicle, is positionable between a raised position and a lowered position, and*

*(iii) a plurality of sensing devices positioned within the interior chamber of the apparatus and aimed at the area, each one of the plurality of sensing devices being configured to generate sensor data corresponding to the damaged vehicle;*

*receiving the damaged vehicle through the opening and into the interior chamber of the apparatus wherein the receiving comprises aligning the opening with the damaged vehicle and driving the apparatus in a direction that causes the damaged vehicle to pass through the opening and into the interior chamber of the apparatus;*

*positioning the damaged vehicle at the area; and*

*performing an inspection of the vehicle using one or more of the plurality of sensing devices to generate sensor data corresponding to the damaged vehicle.*

*40. An apparatus comprising:*

*a vehicle;*

*a housing adjacent to the vehicle and positioned on a lateral side of the vehicle, wherein the housing comprises:*

*an interior chamber sized and shaped to house a damaged vehicle, an area within the interior chamber at which the damaged vehicle is positionable,*

*a front side wall that is substantially perpendicular to a direction of travel of the vehicle, the front side wall forming a first opening sized and shaped to permit passage of a damaged vehicle into and out of the interior chamber,*

*a rear side wall that is substantially perpendicular to the direction of travel of the vehicle and disposed opposite to the front side wall, the rear side wall forming a second opening sized and shaped to permit passage of the damaged vehicle into and out of the interior chamber,*

*a lower surface extending between the front side wall and the rear side wall;*

*a passageway formed through the lower surface and extending between the first opening and the second opening, the passageway being sized and shaped to permit passage of the damaged vehicle through the interior chamber of the apparatus,*

*a lateral wall extending between the front side wall and the rear side wall and disposed opposite the lateral side of the vehicle, and*

*one or more wheels positioned proximate to the lateral wall;*

*a plurality of sensing devices positioned within the interior chamber of the apparatus and aimed at the area, each one of the plurality of sensing devices being configured to generate sensor data corresponding to the damaged vehicle; and*

*a damage assessment system configured to identify damage that has occurred to the damaged vehicle based on an analysis of the sensor data and estimate a cost to repair or replace the damaged vehicle based on the damage identified.*

* * * * *